United States Patent
Lindhorst et al.

(10) Patent No.: US 6,714,219 B2
(45) Date of Patent: Mar. 30, 2004

(54) DRAG AND DROP CREATION AND EDITING OF A PAGE INCORPORATING SCRIPTS

(75) Inventors: Gregory S. Lindhorst, Woodinville, WA (US); Stephen J. Millet, Seattle, WA (US); John P. Shewchuk, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/223,565

(22) Filed: Dec. 31, 1998

(65) Prior Publication Data

US 2002/0089539 A1 Jul. 11, 2002

(51) Int. Cl.$^7$ .............................. G09G 5/00; G06F 9/44
(52) U.S. Cl. ...................... 345/769; 345/762; 345/746; 717/116; 717/105
(58) Field of Search ................... 345/333, 335, 345/339, 762, 765, 703, 744, 745, 746, 747, 764, 769, 770, 506.1; 707/513, 501, 530; 709/201, 203; 717/1, 2

(56) References Cited

U.S. PATENT DOCUMENTS

| | | | | |
|---|---|---|---|---|
| 5,644,739 A | * | 7/1997 | Moursund | 395/354 |
| 5,818,447 A | | 10/1998 | Wolf et al. | |
| 5,845,299 A | * | 12/1998 | Arora et al. | 707/513 |
| 5,862,372 A | * | 1/1999 | Morris et al. | 395/701 |
| 5,875,322 A | | 2/1999 | House et al. | |
| 5,953,731 A | | 9/1999 | Glaser | |
| 5,956,736 A | * | 9/1999 | Hanson et al. | 707/513 |
| 5,960,436 A | | 9/1999 | Chang et al. | |
| 6,035,119 A | * | 3/2000 | Massena et al. | 395/701 |
| 6,059,838 A | | 5/2000 | Fraley et al. | |
| 6,138,150 A | * | 10/2000 | Nichols et al. | 709/219 |
| 6,272,673 B1 | | 8/2001 | Dale et al. | |
| 6,275,935 B1 | | 8/2001 | Barlow et al. | |
| 6,304,893 B1 | | 10/2001 | Gish | |
| 6,421,068 B1 | * | 7/2002 | Ingrassia et al. | 345/762 |
| 6,425,120 B1 | * | 7/2002 | Morganelli et al. | 717/109 |

OTHER PUBLICATIONS

Lauray Lemay, "Microsoft Front p. 98", SamNet, pp. 120–125, 160–170, and pp. 525–535.*
Ingham, David B., "W3Objects: A distributed Object–Oriented Web Server", Sixth International World Wide Web Conference, 7th Apr. 1997, pp. 1–4.
W3Objects Publications, w3objects.ncl.ac.uk/pubs/, 1995–1998 Arjuna Project, Computing Science, Newcastle University, Last modified Feb. 25, 1998.
Ingham, David et al., "W3Objects: Bringing Object–Oriented Technology to the Web", obtained Jun. 16, 2002.
Business Wire, "Next Microsoft 2: NeXT Software and Microsoft Corp.", Mar. 12, 1996, pp. 1–2.
Sleeter, Melissa E., OpenDoc— building online help for a component–oriented architecture, Annual ACM Conference on Systems Documentation, 1996, pp. 87–94.

* cited by examiner

*Primary Examiner*—Kristine Kincaid
*Assistant Examiner*—Thomas J Joseph
(74) *Attorney, Agent, or Firm*—Banner & Witcoff, Ltd.

(57) ABSTRACT

An environment for developing clientside/serverside code is disclosed. The environment supports programming in an event-driven paradigm while the execution of the resultant programs are executed in a serial execution paradigm. Through shielding the developer from complex scripting segments, the environment provides the developer with the suggestion that that resultant execution model is event-driven. By treating scripts as later-definable objects, the designing phase of a page may be lessened, as the appropriate codings needed to implement a page are determined at a later date. In one example, the codings may be preliminary set as server side or client side, with the environment later adding the appropriate scripting language to complete the developed page.

7 Claims, 11 Drawing Sheets

DRAG AND DROP CREATION AND EDITING OF A PAGE INCORPORATING SCRIPTS

I. RELATED APPLICATION INFORMATION

The present application is related to U.S. Ser. No. 08/959,300, entitled "Method and Apparatus for Automatic Generation of Text and Computer-Executable Code", filed on Oct. 28, 1997. Also, the present application is related to U.S. Ser. No. 09/223,773, "A System for Converting Event-Driven Code into Serially Executed Code", filed on Dec. 31, 1998; to U.S. Ser. No. 09/223,558, entitled "Transporting Objects Between A Client and A Server", filed on Dec. 31, 1998; and, to U.S. Ser. No. 09/223,774, entitled "Page Object Model", filed on Dec. 31, 1998.

II. BACKGROUND OF THE INVENTION

A. Technical Field

In general, the present invention relates to authoring of text and computer-executable code, and more particularly to techniques for automatically generating HTML (hypertext markup language) script.

In recent years, the Internet has experienced tremendous growth. Its rapid development has resulted in a growing number of new uses of the Internet and its multimedia component, the World Wide Web (the Web). In particular, demand for richer, faster and more interactive web sites have been driven increasingly sophisticated users. To attract more demanding users, commercial and corporate Internet site authors attempt to stay ahead of their competition by providing more sites for users and potential customers.

Enabling the growth of the Internet, corporate users have expanded the application of HTML into intranets. In this area, creators of authoring tools have strived to enable authors to create content-rich web sites with minimal effort.

When the world-wide web was first invented, the language used to publish data was a simple text-oriented formatting device. A server would send HTML documents to a client computer running a browser that would display the HTML content on the screen according to the formatting information embedded in it. The browser would transmit a request for a particular HTML file and this HTML the server in response to the request would transmit file to the client. These HTML documents contained references to graphic files, which were also sent from the server to the client and displayed according to the embedded instructions in the HTML code.

As the web grew in popularity, second-generation websites added more sophisticated formatting such as tables and frames and displayed graphics as background along with other formatting devices. Still, content was still contained in files that were simply transmitted to browsers in response to requests for particular documents. In addition, server-side programs would custom-generate HTML documents in response to requests for specific information. For example the server would access a database in response to a search query and produce an ephemeral HTML document that it would then send to the browser. However, such interactive sites were not common because of the sophisticated server-side scripting that was required. Even after third generations sites, which provided Java script applets, Adobe PDF files, animated graphic files, offered rather sophisticated look to sites, most sites relied on simply pushing fixed documents and applets to browsers in response to specific requests.

Recently with the introduction of Microsoft® Corporation's (of Redmond, Wash.) Visual InterDev® 1.0 product, the process of creating sites that custom-generate files for consumption and display by browsers has been dramatically simplified by employing various interesting techniques. These include:

1. Server-side scripting (Active Server Pages—ASP—developed by Microsoft®) that allows dynamic web applications similar to Java, DHTML, and Active-X, which run on the client. An event occurring on the client is transmitted to the server application and new page-layout data is sent to the client to show the result.
2. ASP objects that are wizard-like components that work similarly to Active-X controls implemented on clients. They have properties, methods, and events and must be instantiated (except for some pre-instantiated components that are always available).
3. Web Bots included in Front Page 97® are server-side components that add functionality like that provided by CGI scripting.
4. Visual InterDev® 1.0's raison d'etre, perhaps, is the convenient integration of databases with web sites without sophisticated programming. This integration is simplified through the use of a compatibility standard and a suite of pre-defined tools that may be incorporated in ASP script.

ASPs may be called using a URL (uniform resource locator) which may refer to the ASP file "page.asp" as follows: "<http://www.anycompany.com/page.asp>." While the following description uses the term "active server page" or "ASP," any document or page which contains a script which, when executed, pulls data from a database and forwards it to an end application (another document or page) falls within the scope of the term, ASP, as used herein.

Requests to ASPs commonly take the form of user requests from a client's browser. An example of a request is a request for current sport scores from a web site. In the process of requesting, the browser, located on the client, accesses the ASP with a request that provides additional information to the server. For example, an active server page, named "scores", may be connected to a database storing all current sport scores. To access any particular set of scores, a browser user specifies to the server which scores are of interest (here, baseball scores). Next, the browser attempts to access the <scores.asp> file with a "baseball" parameter attached to the file request (e.g., <scores.asp?sport=baseball>. In this example, "scores.asp" is the active server page on the server, "sport" is a filter control handling the parameter "baseball". In response to this request, the server forwards the desired baseball scores in HTML format back to the browser. Upon receiving this new information, the current page is flushed and the new HTML data (containing the baseball scores in a predefined format) is displayed in the end user's browser. The returned information can also be images, documents, links to images or documents, or other data.

There are a few downsides to the use ASPs in complex sites. First, referring to an ASP with the current scripting parameters is laborious especially with long parameter strings. Developers who are familiar with higher order languages (including C++ and VISUAL BASIC 5.0®) must revert to complex naming schemes for creating the client and server side scripts. This reversion creates the opportunity for errors and the need for additional debugging time.

Also, as currently used, each ASP is directed to a single script. For a large web site, with each and every ASP, no matter how closely they are related, the ASPs require a separate files. Thus, the number of required files for a complex site grows significantly. To this end, maintenance of the site becomes extremely complex and inefficient as each modification to the site may require significant redrafting code for the multiple ASPs. The near duplication of the ASPs can require significant expenditures in time and planning of the web site, when a number of ASPs are so closely related. Currently, there is no efficient way of consolidating ASPs into related groups.

In addition to the above functional elements, Visual InterDev® 1.0 includes a host of features that relate to the development environment. Basically these features include such well-known user-interface features such as drag-and-drop, WYSIWYG, etc. Developers are allowed to instantiate programming objects using a visual metaphor. These ideas are well developed in the Microsoft Visual Basic® product which takes these ideas substantially further than was possible in Visual InterDev® 1.0 for a number of reasons which are explained below.

The development of web applications is complicated by a number of features stemming from the web context. In a classical client-server context, the capabilities of the client computer and those of the server computer are defined in advance of development of applications. In the web environment, the capabilities of the client are not clearly defined. Some clients run browsers such as 2.x browsers lack capabilities, such as the ability to run Java applets that are present in 3.x and 4.x browsers. A web application that seeks to provide sophisticated functionality is confronted with the problem of where to run the code that generates the sophisticated functionality sought: on the client or on the server. Some simple tasks can be performed on "dumb" clients such as forms. A programmer is basically stuck with the problem of writing programs that can handle both situations: putting the sophistication on the server, sending plain HTML to the dumb clients as well as putting the sophistication on the client sending program components to a smart client and letting the client run them.

Another feature of web applications is that the client-server interaction is both ephemeral and contentious in that the number of different clients potentially compete for the limited resources. For this reason, web pages that are generated by server scripts are generally dumped after they are sent to the client. The request data transmitted by the client can be saved for a limited "lifetime" to allow a user to recall the web page. ("Lifetime" may embrace any criterion used for determining whether to persist a page, for example, for a period of time after the user's last visit or as long as the user continues to view and revisit the page without visiting another site, etc.) This involves regeneration of the page. This situation is not too bad in and of itself. However, scripting the calling and called pages to handle the control flow required inevitably involves a lot of tedious old-fashioned sequential coding. That is, at a minimum, to add a page's content, or to employ any script incorporated in the page, to a calling page, the calling page must be scripted to handle the called page, and the called page, a return to the calling page. Conditional branching would also be involved which can be tedious and complex.

There is currently no way to incorporate the functionality of a destination ASP into a current page. Placing the following tag on a client's page "<A HREF="http://www.anycompany.com/alpha/page.asp">" allows the user to select the tag and navigate to the ASP named "page.asp" in the "alpha" directory of the www.anycompany.com site. However, once the page.asp is selected with specific parameters, the current page is lost with all its information. The only way to return to the current page and modify the information transmitted to the ASP is by backtracking and re-entering the previously entered parameters. While object-oriented programming exists with respect to other programming areas, there is little or no support for objects in program files of HTML pages including ASPs.

Returning to the general problem of "managing state," consider the "lifetime" of a simple ASP page that contains a form for data-entry into a database:

User navigates to the page—an HTTP GET causes the server to run the ASP to produce a page for the client.
The browser displays the page and the user enters data and submits the form, causing an HTTP POST to the server.
The server runs the ASP page again to process the post. The code parses the post parameters, updates the database and produces a new version of the page for the client that informs the user the data has been successfully entered.

It is clear that if the web developer wants to maintain some state information over the lifetime of the page, then simply declaring a variable in client or server code is not sufficient. And obviously the developer must do much more if it is necessary to share this state information between code on the client and server.

There are three categories of state information:

Page—maintained for the lifetime of a page
Session—maintained for the duration of a user's session
Application—maintained for the duration of the application for all users ASP supports caching data and objects in the server in the Session and Application objects, providing a means for maintaining session and application state information. A common technique for managing page state is to place values in hidden form elements. The form elements travel with the page to the client, can be modified, and they travel with the HTTP POST data back to the server. A developer using this technique must write server code to create the form elements on the page, write client code to access the form elements through the Document Object Model, write more server code to parse the values from the post parameters, and must be sure to write the values back out in the form elements for the new page that is sent to the client in response to the post. This is another common task that complicates web programming and results in duplication of effort. In addition to the coding overhead, the sheer complexity of sites with a high degree of sophisticated functionality can be oppressive. Being stuck with old-fashioned sequential programs makes the management of the development and improvement of web sites exceedingly complex, even unwieldy.

Finally, the way a client or server accesses an ASP is through script on the client/server page. Managing these scripts can be confusing as the scripts on the server and the client may look similar, yet require slightly different structures and parameter fields. Adding to the level of complexity, in some instances, the server script may generate the client script. To keep track of the complexity of scripts, some page editors color code client script differently from server script. However, as pages become increasingly complex, color-coding is not sufficient to support complex site management as the site becomes increasingly harder to conceptualize.

III. SUMMARY OF THE INVENTION

A method and apparatus for the development of web sites treats web page script files and components according to an event-driven model and more generally as objects with exposed methods and properties in a manner that, at development time, provides a common appearance whether the associated script or components are ultimately run on the client or the server. According to a feature, script files and even simple HTML pages are referenced as objects to provide a simple programming naming structure (also referred to as a simplified namespace) and obviate sequential coding structure otherwise required to cross reference code and page content among various callable elements of a web site.

Using the invention, ASPs are able to appear to other files as objects with associated methods and properties. The methods are written in a widely supported language (for example, Javascript, Livescript, or JScript). The properties are stored on the server side so as to allow multiple clients to access stored properties. Proxies of the properties are transmitted from the ASP to the client as needed.

Also, according to the invention, ASPs may contain various objects within each single page. Instead of creating each separate ASP to support a particular set of functions, the functions may be converted into objects and stored in a general ASP. Based on these adaptations, ASPs are readily adopted by high level programmers trained in object-oriented programming rather than to manually written executable scripts for HTML pages.

One technique of referring to ASPs as objects, and the nesting the objects within the ASPs, is through design-time controls developed by Microsoft®. Additional disclosure of design-time controls is described in U.S. Ser. No. 08/959,300, entitled "Method and Apparatus for Automatic Generation of Text and Computer-Executable Code", filed on Oct. 28, 1997, the contents of which are incorporated for any and all essential subject matter. A design-time control may be a form of a generic control (for example, an ACTIVEX® control, of the Microsoft Corporation of Redmond, Wash.). In general, a design-time control allows a developer to place a script in a document that alters or enhances the operation of the document.

Design-time controls incorporate wizard-like interfaces that can be edited to modify the text they generate for a web page. DTCs take advantage of OLE design-time capabilities (including direct manipulations, property sheets, and persistence) to capture user inputs, thereby extending the capabilities of editors that support design-time controls.

A design-time control differs from a general control in that it operates only in an editor (or container) when a web site is being designed or maintained. Once the web site is saved, the design-time control may create (among other things) script for the client/server/ASPs. As applied to the present invention, the developer uses the design-time control to attach object identification information including method and property information to each ASP. When saved, the attached object identification information and methods and properties are converted from the high level, object-oriented programming language into the appropriate HTML recognizable representations so that any client/server system supporting HTML may use the rendered client/server files. Currently, end users are limited to a small number of browsers. By using design-time controls to write multiple versions of the client/server script, the number of different clients' browsers and servers that can be supported almost limitless because each browser can be supported in one or more DTCs.

Editors insert design-time controls, which allow a page to operate as an object (referred to as a "page object" or "P.O. DTC") into the ASP files. These 'P.O. DTCs', when instantiated in an editor, provide the user interface which supports the disclosed programming model reduced with naming requirements. When run in an editor, the P.O. DTC prompts the user for various information regarding the file itself (e.g., "am I an object? What are my method and properties?"). Thus, the page object is put onto the page by the user. The user interacts with the DTC's user-interface to indicate what methods and properties define the page as an object. As a result, the DTC generates the appropriate script (client-side or server-side).

As used herein, a persist operation refers to writing information to a non-volatile storage medium where the information relates to the current state of an object. The information written is such that, when the object is recreated in memory, the object can be restored to its previous state. Herein, an instantiate operation refers to creating an instance of an object type in memory.

In one embodiment, the present invention uses a Component Object Model (COM) component thereby allowing the controls to be utilized across multiple applications. Advantageously, the present invention may be implemented within any type of HTML editor, including but not limited to, Front Page 98® and Visual InterDev 98® editors.

As used herein, ASP objects are generalized with the scripting namespace of page.method and page.property. The "page" is the ASP page. The "method" and "property" are those associated with the page, as specified through the P.O. DTC.

The present invention may be utilized in applications that require complex or lengthy scripting thereby alleviating the burden on developers or programmers. Also, the programmer need not know all of the details necessary for scripting since the control of the present invention can perform the necessary scripting. Such applications may include applications incorporating complex database controls, for example.

The script generated by the Page Object DTC includes server script, which creates a JavaScript object. The JavaScript object is given the name that user assigned to the Page Object. That object may then be referenced by script on the page whenever the public methods and properties of the Page Object are to be accessed. For example, if the user assigned the name 'Statistics' to the Page Object and wanted to access the 'Totals" property, the user would write script that referenced the name 'Statistics.Totals.' Note that the script needed to construct the "Statistics' object was generated by the Page Object DTC at design time.

As noted above, the server script may be different from the client script. Here, on the JScript proxy object is created for the server side and one for the client side. These may be different since the methods and properties accessible in each domain may differ. For example, ASP page "Foo" contains three methods: A, B, and C. The developer makes A accessible on the client and server, makes B accessible on the server, and C accessible on the client. The resulting server proxy object would provide A and B methods, while the client proxy object would provide A and C methods. Using the term "exposed" in this example, the developer exposed A and B to the server and exposed A and C to the client.

Methods exported by the Page Object according to the invention are implemented as server methods. As the enclosed document describes, there are other methods associated with the Page Object which are automatically available with the Page Object, but they are conventional methods which are available in the local 'space' (the document describes the term 'space').

To simplify the programmer's task of navigating between pages, constructs such as window.location.href= page.asp?routing=shuffle&parameter1=value are replaced by constructs such as page.navigate.shuffle (value), which are more natural for a programmer.

Further, the editing environment may be modified to replace all scripting requirements with a "drag-and-drop" interface where each new object is dropped into a page and, through the use of property and method pages, modified in accordance with the developers requirements.

In this case, the developer need never interact with the HTML; rather, the editor would convert the various objects into clientside/serverside/ASPs scripts and pages as appropriate. The present invention may be implemented by any number of editors. Available editors include, for example, Visual InterDev 98 and FrontPage 98 (by the Microsoft Corporation).

These and other novel advantages, details, embodiments, features and objects of the present invention will be apparent to those skilled in the art from following the detailed description of the invention, the attached claims and accompanying drawings, listed herein, which are useful in explaining the invention.

IV. BRIEF DESCRIPTION OF THE DRAWINGS

In the following text and drawings, wherein similar reference numerals denote similar elements throughout the several views thereof, the present invention is explained with reference to illustrative embodiments, in which.

V. DETAILED DESCRIPTION

Figure 1:
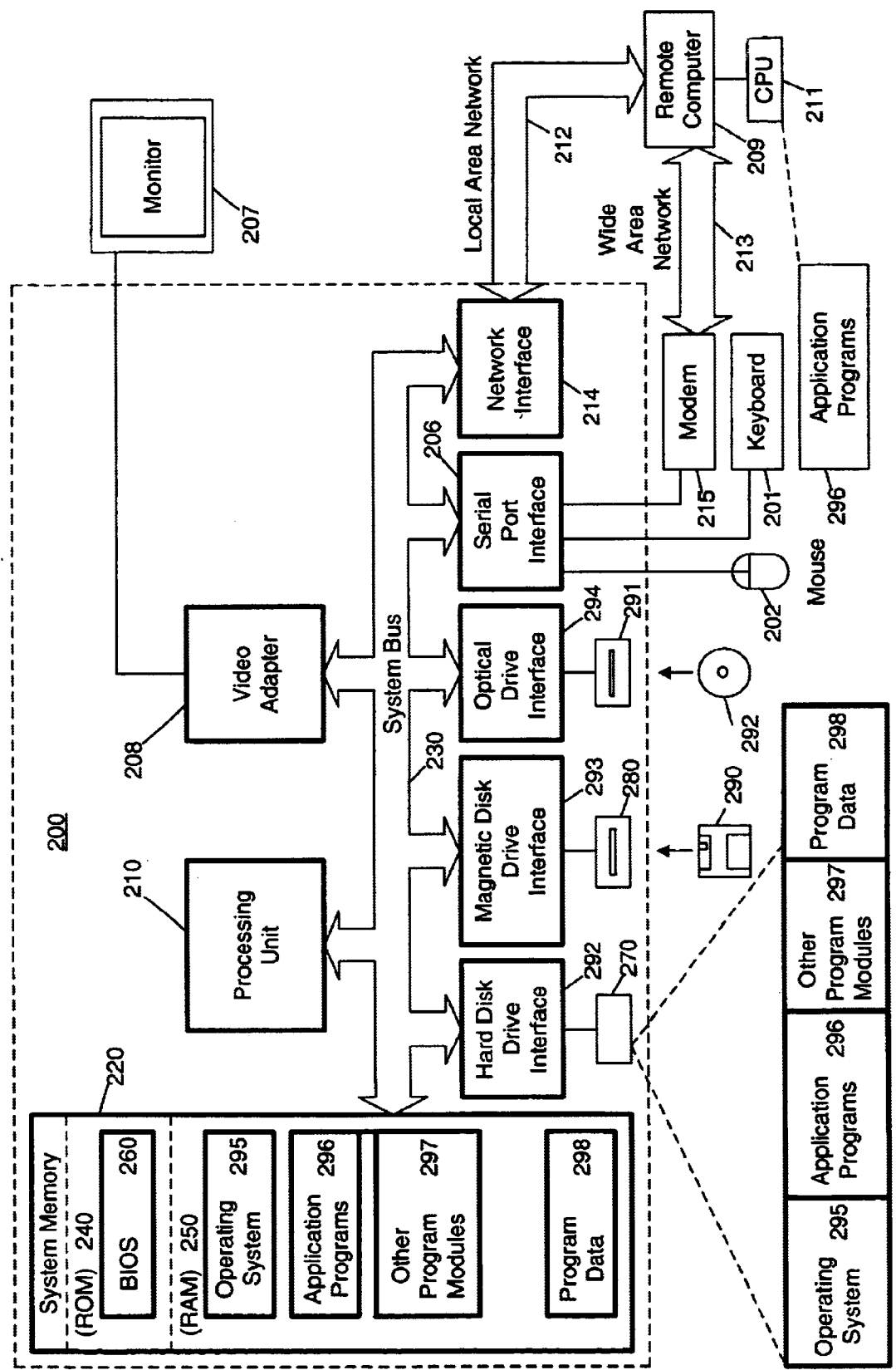
FIG. 1 is schematic diagram depicting a computing environment according to embodiments of the present invention.

The present invention is described as it would be used for Internet applications, which is one embodiment of the invention. The present invention, however, may be implemented generally within any number of computer applications including any software development tool for authoring text and computer-executable code. In the context of developing web pages, the present invention provides a tool for efficiently authoring hypertext markup language (HTML) text and script. In this context, the present invention may be implemented within an authoring tool such as, for example, Visual C++, Visual InterDev and Visual J++ by Microsoft Corporation of Redmond, Wash.

As used herein, HTML script is intended to include the various scripting languages available for execution on browsers. The actual scripting language used when converting from the following programming environment into the HTML environment may vary based on the browsers to which the HTML code is to be eventually sent. Since the language, JavaScript is common to both Internet Explorer 4® (from Microsoft® Corporation) and Netscape Navigator 4 ® (from Netscape® Corporation), this language may be used. Other languages be used supported by an increasing number of browsers are also becoming available.

Although not required, the invention will be described in the general context of computer executable instructions, such as program modules. Generally, program modules include routines, programs, objects, scripts, components, data structures, etc. that perform particular tasks or implement particular abstract data types. Moreover, those skilled in the art will appreciate that the invention may be practiced with any number of computer system configurations including, but not limited to, distributed computing environments where tasks are performed by remote processing devices that are linked through a communications network. In a distributed computing environment, program modules may be located in both local and remote memory storage devices. The present invention may also be practiced in personal computers (PCs), hand-held devices, multiprocessor systems, microprocessor-based or programmable consumer electronics, network PCs, minicomputers, mainframe computers, and the like.

A. Order of Description

In order to comprehend more readily the embodiments of the invention contained herein, the following lists the order of the contents of the detailed description:

Terms;
General Purpose Computer;
Event Driven Server Model;
Object Lifetimes Exist Apart From Server;
Pages Treated As Objects;
Construction of Objects; and,
Summary.

B. Terms

The following terms are used throughout the specification to relate to various concepts. Four terms described below include design space, composition space, and interaction space. A space is generally an execution environment for a document (or page). Here, the term document is used interchangeably with a page. Traditional examples include a client space and a server space in a client/server model. As many "spaces" may reside on a single machine, a space is therefore distinct from an operating system process alone.

1. Design Space

The design space is the environment in which a developer "designs" or creates a document. The design space is generally a workstation separated from a web server. When the designer has completed work on a document, the document is saved to a web server (or generally a "server").

2. Composition Space

The composition space is the environment generally resident on a server. In the World Wide Web model, when an end user requests a page or document from a server, the server packages HTML and/or additional components and transmits them to the waiting client. In some cases, the server stores an active server page or an ASP (from the Microsoft Corporation or Redmond, Wash.). ASPs are generally pages of script which respond to a browser's request for information. For example, a browser on a client may request all statistics from a given year for a baseball team. The ASP has access to the desired statistics as stored in an accessible database. In response to the browser's request, the ASP retrieves the desired statistics from the database, formats the information into HTML, and transmits the HTML to the waiting browser, where the resulting information is displayed. Here, as the server is composing the pages or documents for the client, the server is referred to as the composition space.

3. Interaction Space

The interaction space is the environment in which the client interacts with the received documents or pages, hence the term "interaction space". Two general types of clients exist: dumb clients and smart clients. The dumb client does not posses the capabilities of handing all instructions or tasks as desired in a pure distributed processing paradigm. Specifically, the client cannot handle all events generated in the interaction space and so needs to send them to the server to have them handled by the server. The smart client, by contrast, has the ability to appropriately hand the events generated locally on the client.

In some cases, even the smart client does not have all information available to it. For example, a designer may have elected when designing a document not to download all possible data sets as most would not be needed by the smart client. By so doing, the designer saves bandwidth while requiring the smart client, like the dumb client, to ask for additional information from the server. Client 4. Design-Time Control Finally, the design time control is a control (for example, an ACTIVEX® control, of the Microsoft Corporation of Redmond, Wash.) that allows a developer to place text or script in a document that alters or enhances the operation of the document.

Design-time controls are similar to embedded wizards that can be continuously edited to modify the text they generate for a web page. DTCs take advantage of OLE design-time capabilities (including direct manipulations, property sheets, and persistence) to capture user inputs, thereby extending the capabilities of an editor which supports design-time controls. Additional disclosure of design-time controls is described in U.S. Ser. No. 08/959,300, entitled "Method and Apparatus for Automatic Generation of Text and Computer-Executable Code", filed on Oct. 28, 1997, the contents of which are incorporated for any and all essential subject matter.

A design-time control differs from a general control in that it operates only in an editor (or container) when a web site is being designed or maintained. Once the web site is saved, the design-time control may create (among other things) script for the client or server/ASPs. As end users are limited to a small number of browsers and using design-time controls to write multiple versions of the client/server script, the number of different clients' browsers and servers that can be supported almost limitless because each browser can be supported in one or more DTCs.

C. General Purpose Computer

FIG. 1 is a schematic diagram of a computing environment in which the present invention may be implemented. The present invention may be implemented within a general purpose computing device in the form of a conventional personal computer 200, including a processing unit 210, a system memory 220, and a system bus 230 that couples various system components including the system memory to the processing unit 210. The system bus 230 may be any of several types of bus structures including a memory bus or memory controller, a peripheral bus, and a local bus using any of a variety of bus architectures. The system memory includes read only memory (ROM) 240 and random access memory (RAM) 250.

A basic input/output system 260 (BIOS), containing the basic routines that help to transfer information between elements within the personal computer 200, such as during start-up, is stored in ROM 240. The personal computer 200 further includes a hard disk drive 270 for reading from and writing to a hard disk, not shown, a magnetic disk drive 280 for reading from or writing to a removable magnetic disk 290, and an optical disk drive 291 for reading from or writing to a removable optical disk 292 such as a CD ROM or other optical media. The hard disk drive 270, magnetic disk drive 280, and optical disk drive 291 are connected to the system bus 230 by a hard disk drive interface 292, a magnetic disk drive interface 293, and an optical disk drive interface 294, respectively. The drives and their associated computer-readable media provide nonvolatile storage of computer readable instructions, data structures, program modules and other data for the personal computer 200.

Although the exemplary environment described herein employs a hard disk, a removable magnetic disk 290 and a removable optical disk 292, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 290, optical disk 292, ROM 240 or RAM 250, including an operating system 295, one or more application programs 296, other program modules 297, and program data 298. A user may enter commands and information into the personal computer 200 through input devices such as a keyboard 201 and pointing device 202. Other input devices (not shown) may include a microphone, joystick, game pad, satellite dish, scanner, or the like. These and other input devices are often connected to the processing unit 210 through a serial port interface 206 that is coupled to the system bus, but may be connected by other interfaces, such as a parallel port, game port or a universal serial bus (USB). A monitor 207 or other type of display device is also connected to the system bus 230 via an interface, such as a video adapter 208. In addition to the monitor, personal computers typically include other peripheral output devices (not shown), such as speakers and printers.

The personal computer 200 may operate in a networked environment using logical connections to one or more remote computers, such as a remote computer 209. The remote computer 209 may be another personal computer, a server, a router, a network PC, a peer device or other common network node, and typically includes many or all of the elements described above relative to the personal computer 200, although only a memory storage device 211 has been illustrated in FIG. 1. The logical connections depicted in FIG. 1 include a local area network (LAN) 212 and a wide area network (WAN) 213. Such networking environments are commonplace in offices, enterprise-wide computer networks, intranets and the Internet.

When used in a LAN networking environment, the personal computer 200 is connected to the local network 212 through a network interface or adapter 214. When used in a WAN networking environment, the personal computer 200 typically includes a modem 215 or other means for establishing a communications over the wide area network 213, such as the Internet. The modem 215, which may be internal or external, is connected to the system bus 230 via the serial port interface 206. In a networked environment, program modules depicted relative to the personal computer 200, or portions thereof, may be stored in the remote memory storage device. It will be appreciated that the network connections shown are exemplary and other means of establishing a communications link between the computers may be used.

D. Event Driven Server Model

The conventional web server model, active server page/cgi model, is a sequentially executing set of code. For designers, the conventional web server model is confusing at best because designers are generally more comfortable with event driven models. For example, the conventional way of coding a server includes the steps of sequentially code each line to retrieve and operate on information. To sequentially code an ASP, the designer must have a secure grasp of what each and every component in the ASP performs as well as how the components interrelate. A developer must be an expert in code and in script. To this end, the linear programming approach results in embedded HTML code in the ASP intermingled with logical script. The resulting ASP and sets of ASPs can become harder to organize and comprehend. Further, this text-streaming approach to authoring does not work well in the WYSIWYG (what you see is what you get) environment as the standard ASP becomes increasingly difficult to parse into different colors for an increasing number of different elements (server script, client script, server script which generates client script, comments, text, and the like). Moreover, a designer needs to readily comprehend the subtle differences between client script and server script and the interaction between them.

Figure 2:
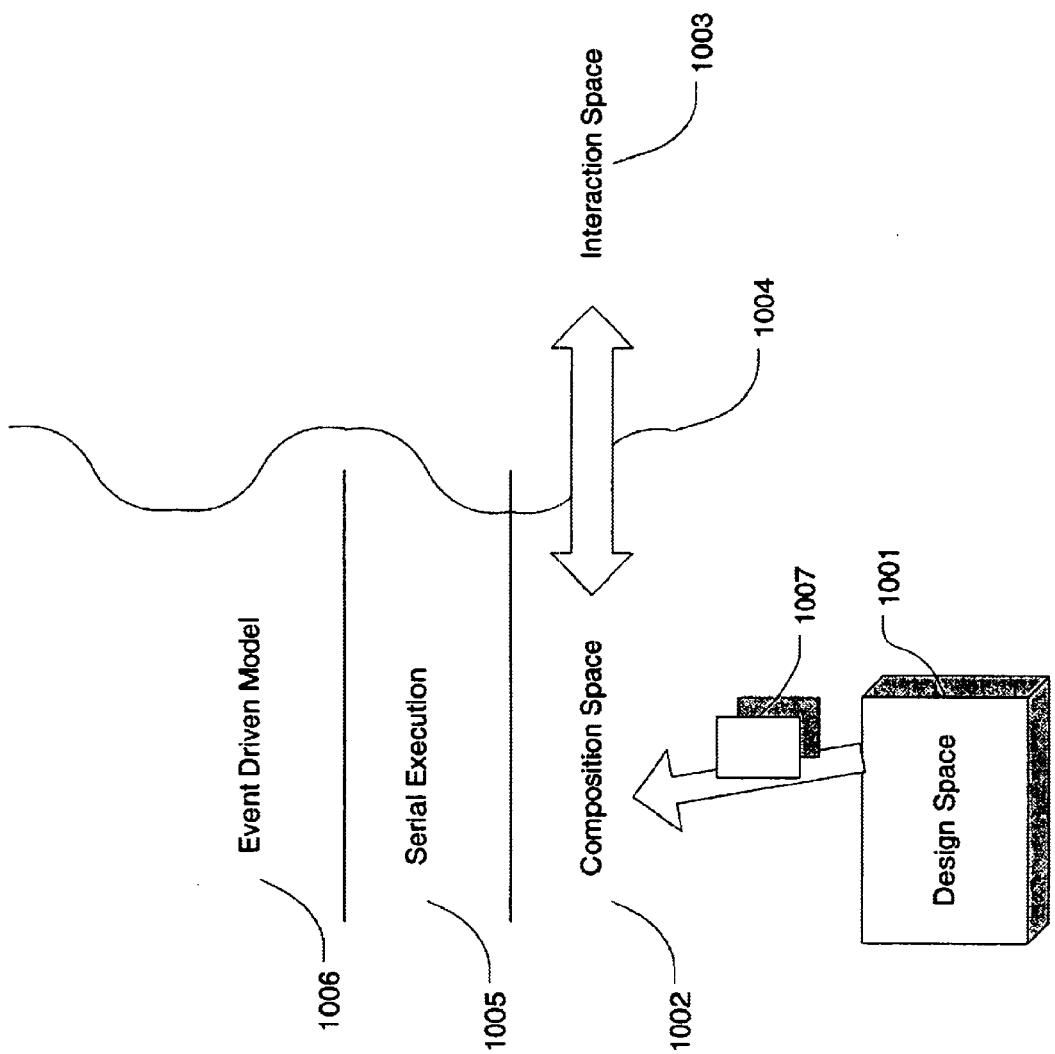
FIG. 2 is a diagram of the various spaces according to embodiments of the present invention.

As shown in FIG. 2, one aspect of the present invention relates to alleviating the designing difficulty associated with the designing of documents that are transported across the server/client transition. FIG. 2 shows design space 1001 outputting a document or documents 1007 that are stored in composition space 1002. While composition space 1002 remains a serial execution environment 1005, the present invention provides an event driven model 1006 to ride on top of the serial environment 1005 so as to present the appearance of an event driven model to the designer when designing in the design space. Accordingly, the designer may write code and script in the design space as they relate to each other in event driven relationships, while the underlying paradigm for the server as serially executed remains conventional.

As also shown in FIG. 2, interaction space 1003 exists across the server/client transition 1004. The conventional model requires in-depth knowledge of the differences between the two scripting environments 1002 and 1003. By using the event-driven model of the present invention, the distinction between the two scripting environments 1002 and 1003 is kept hidden from the designer, which in turn allows the designer to conceptualize the combination of the composition space 1002 and the interaction space 1003 as a single unified environment. This single environment makes the designer's task easier by allowing the event model of the present invention to handle the scripting and coding for the composition side 1002 and the interaction side 1003 of the division 1004.

Figure 3:
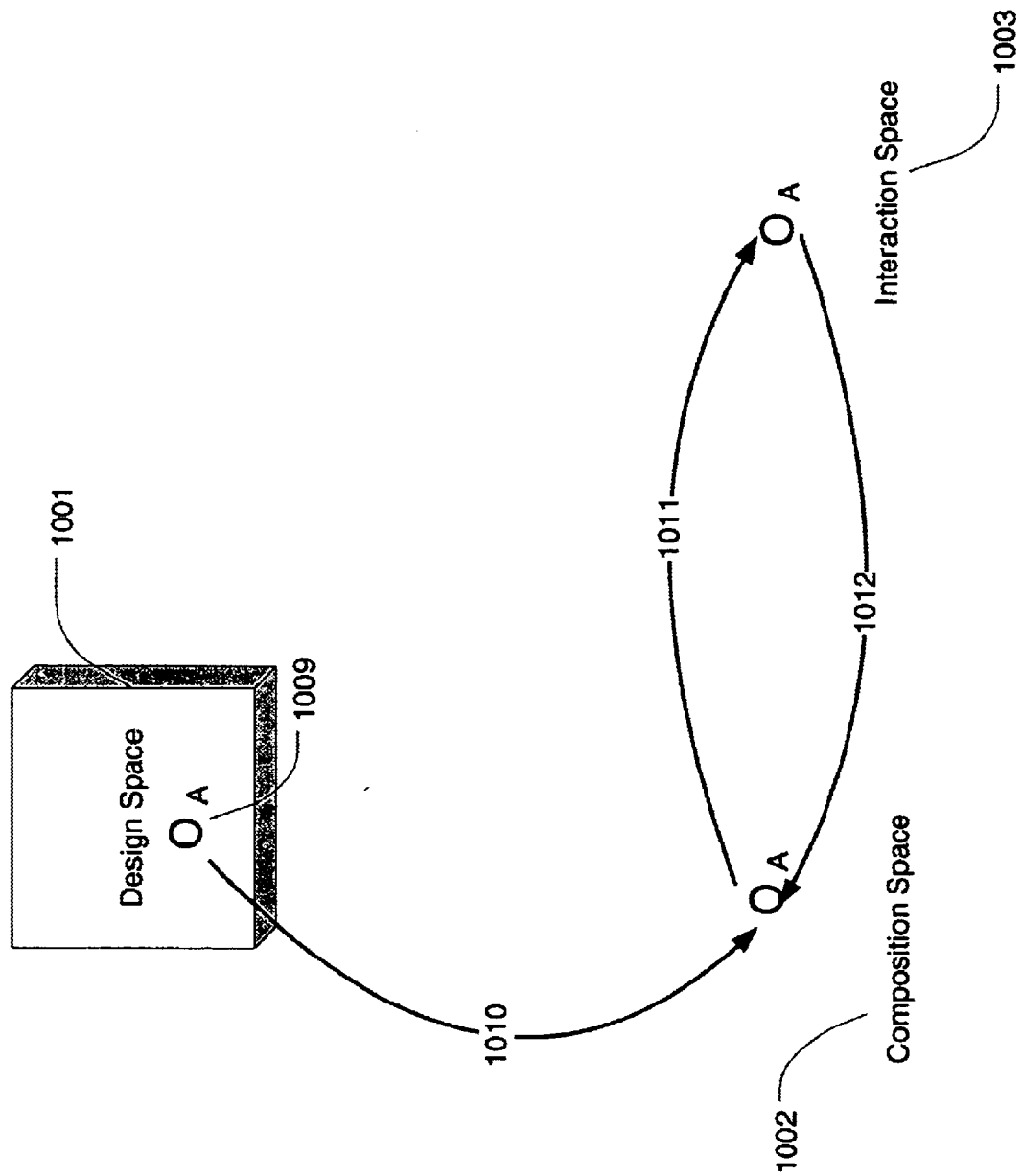
FIG. 3 is a diagram of how an object may move across spaces according to embodiments of the present invention.

An outgrowth of the event model as shown in FIG. 2 is the representation of conceptual objects moving between the various spaces. FIG. 3 shows the design space 1001, composition space 1002, and interaction space 1003 as related to FIG. 2 and including object $O_A$ 1009. The concept of Object $O_A$ 1009 placed on a document is created in design space 1001 and ported to composition space 1002 through transition arrow 1010. When requested by a browser in the interaction space 1003, the conceptual object $O_A$ 1009 moves through transition arrow 1011 to the interaction space 1003. For further modification or event handling, conceptual object $O_A$ 1009 moves through transition arrow 1012 back to composition space 1002 based on an action or event having occurred in interaction space 1003. While in the abstract, object $O_A$ 1009 moves intact between the various spaces 1001, 1002, and 1003, this abstraction is referred to as a conceptual object as the designer may simplistically view the object as moving between spaces while the event model handles the complex coding to create the simplistic appearance of the transitioning object. The complex coding underlying the event model and the representation of an object moving between spaces is treated in greater detail below.

Figure 4:
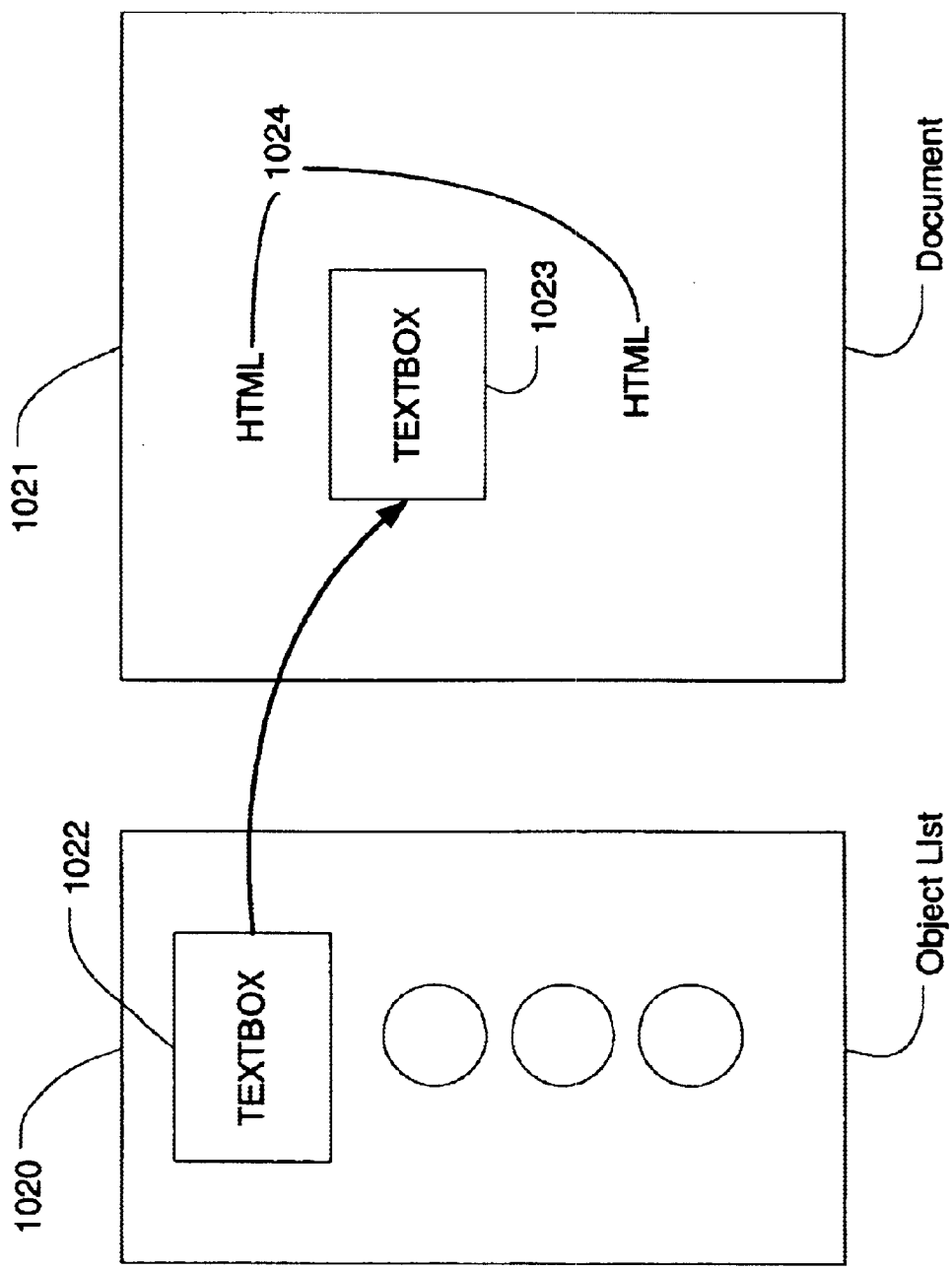
FIG. 4 is a user interface for placing an object on a page according to embodiments of the present invention.

Programmers are generally accustomed to the Visual Basic programming model where a designer constructs a form as containing objects with associated methods, properties, and events. Next, the designer writes Visual Basic code against the object to cross-link the object with other objects on the form or application. In the conventional web model, objects are not used, but rather each page is serially written for placement on the serial execution server. To alleviate the programming difficulties for the designer, one aspect of the invention provides a user interface that supports the inclusion of objects in a document as being "dragged-and-dropped" into position on the page. For example, referring to FIG. 4, a text box object is to be included on a page. Array 1020 shows a grouping of objects that may be incorporated into page 1021. In this example, text box object 1022 is selected from array 1020 and dropped into position on page 1021. Surrounding deposited object 1023 is HTML code 1024. In one presentation of page 1021 to the designer, while the page 1021 is in design space, the representation of text box 1023 is not a listing of HTML code, but rather a visual representation of the text box (in this example, a box with text in it). Next, once the text box 1023 is on the page, the designer may assign properties to the text box 1023, perform various methods on the text box 1023 or on the contents of the text box 1023, and assign relationships between other objects on page 1021 and text box 1023.

This hiding of the code of the text box allows the designer to be free from the encumbrances of confusing amounts of code layered upon code layered upon more code. Also, by not having the code for the text box 1023 fixed by using a DTC, the DTC may respond to subsequent changes without having to be reconfigured for the page.

In one aspect of the invention, text box 1023 may be a design time control that inherits information from its inclusion on page 1021 and where it is included on page 1021 to create server/client script for the page when stored in the composition space. The server/client script as stored in the composition space 1002 may have the actual HTML code for the text box or it may generate the HTML code to represent the text box object 1023 based on information received from the interaction space 1003. In these two representations, if the HTML code is fixed in the composition space, then the representation of the text box may not be altered by subsequent interactions in the interaction space 1003. However, if the composition space 1002 has a representation of text box 1023 and the representation 1023 is responsive to data received from another source or retrieved from the server, then the text box may be recomposed in the composition space 1002 to conform to the received data.

Through the use of DTCs, it is now easier to write applications for server script or client script. In on aspect of the invention, a property value can be set, in this case, whether to be scripted on the server or scripted on the client for the handling of an event. The decision where to send scripting is made at design time. In this case, the ability to set the scripting location (of to what space the script is directed) provides a number of advantages. In particular, the DTC may be programmed with the appropriate scripting information so that when creating code, the DTC can place the appropriate code in the correct location, alleviating this tedious coding task from the designer.

Also, another advantage in using DTCs to promote the programming object model is in linking the various controls in script is made easier through the use of DTCs. For example, the same code for an object cannot be used in both the client and server. Rather, the client code should send the event to the server code and the server code should handle the event. So, the designer is faced with two runtime environments. While both are performing related operations, the server code and client code need to interact so as to produce a unified result. In accordance with the present invention, a DTC does not know what type of environment it will be placed. Only when configured in design space and saved to the server does the DTC operate to instantiate the correct scripting in order to accomplish the goals of the original object. In the case, where the DTCs are configured to handle the events on the server, this may be referred to as server binding as the event handling is bound to the server. When the events are to be handled by the client, for example, in DHTML, this may be referred to as client binding as the event handling is bound to the client.

Another advantage of DTCs is that one can set a DTC to inherent part of its properties from the page that it is located. For example, if the page is intended to be a client-bound page, a designer need only drop the DTC onto the page in the design mode and allow the DTC to configure itself in accordance with the properties of the page in which it is placed. Alternatively, the designer may want to specify the DTCs separately, as some event handlings are more appropriate for the server and others for the client.

It is noted that the composition space/interaction space objects exist apart from the DTCs. DTCs are not required to implement the features of instantiating an object. Rather, one can include a variety of objects including use their methods, define their properties, and write script against them without using DTCs. An example of the use of object without the use of DTCs is through the existence of scripting libraries. Scripting libraries, also covered in greater detail below, are accessible libraries of script which allow one to include the objects from the library in a page without using DTCs. While the end page may be identical in the composition space or interaction space to one created through the use of a DTC, the DTC provides an abstraction from the text-streaming approach to creating pages to that of using a Visual Basic-type interface to drop objects on a page and define their methods and modify their properties on property pages and method pages as controlled by the DTCs.

E. Object Lifetimes Exist Apart from Server

The objects addressed above conceptually move from space to space as shown in FIG. 3. While in some instances, the actual representation of the object may exist in the composition space 1002 (for example, a server object), the conceptual object moves between spaces. To highlight the features and operations of objects as they move between the various spaces, FIG. 5 provides an example.

Figure 5:
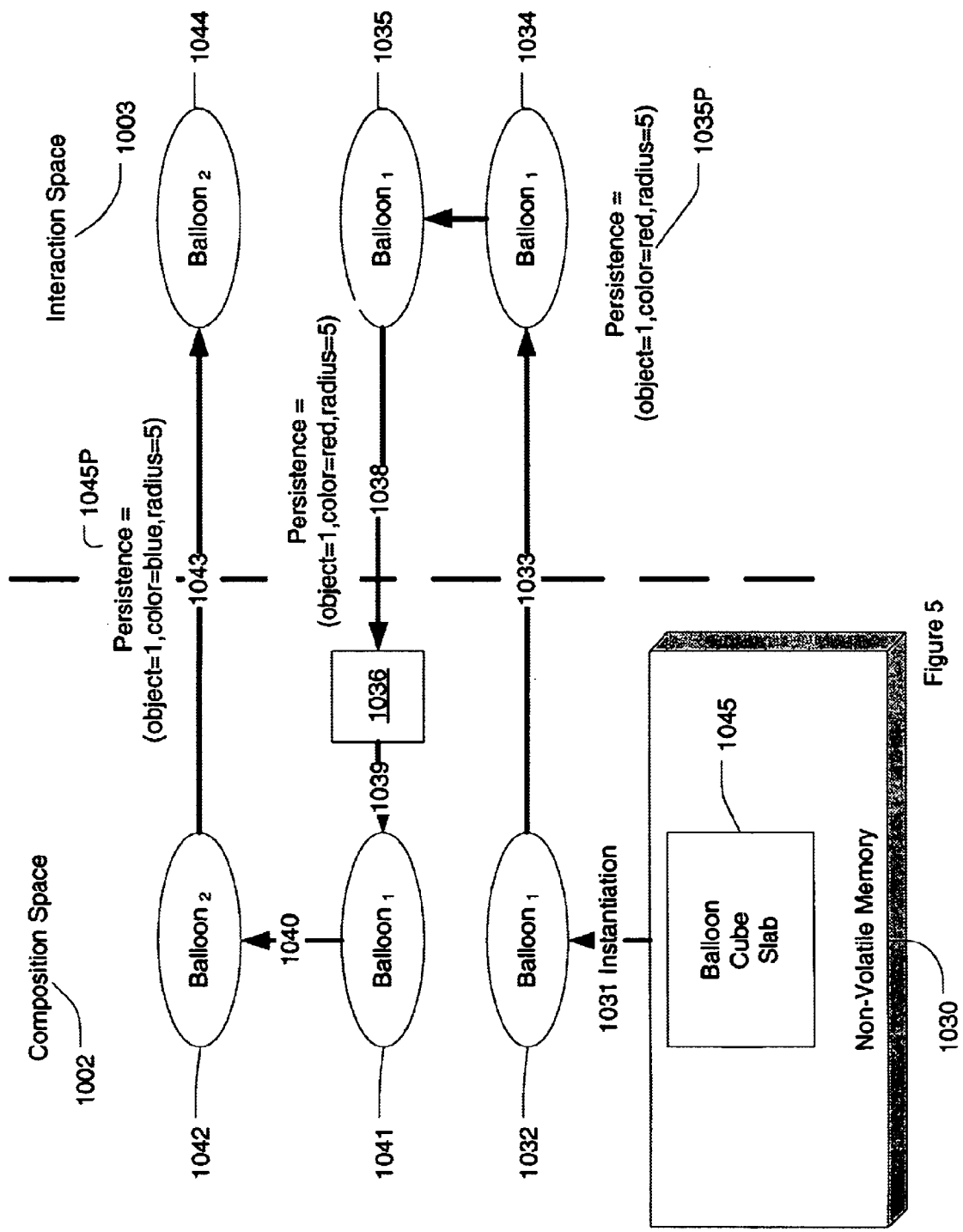
FIG. 5 is a state diagram for modification of an object across the server/client boundaries according to embodiments of the present invention.

FIG. 5 shows composition space 1002 and interaction space 1003 as including a non-volatile memory 1030 in at least one of the two spaces 1002 and 1003. An ASP page 1045 containing objects is stored in non-volatile memory 1030. The ASP page 1045 includes objects balloon, cube, and slab. These objects may have associated methods and properties. In response to a request from a browser in interaction space, the ASP page 1045 executes and instantiates (step 1031) the object "balloon" with stored property information from non-volatile memory 1030 so as to create balloon$_1$ 1032. Balloon$_1$ 1032 is then transmitted (step 1033) to interaction space 1003 and appears as balloon$_1$ 1034 with persistence information 1035P. In this example, the object balloon$_1$ 1034 is transmitted with its own code to interaction space 1003. The persistence information 1035P that accompanies balloon$_1$ 1034 describes the properties of received balloon$_1$ 1034. Here, the properties are (object number=1, color=red, radius=5). Next, in the interaction space 1003, the browser receives an event 1036 (for example, a request to paint the balloon$_1$ 1034 blue). The balloon$_1$ 1034 has not changed but, having received event 1036, is identified as balloon$_1$ 1035. The browser transmits (step 1038) the event 1036 to the composition space to handle the event. The information transmitted to the composition space 1002 include the event 1036 (paint blue) and the persistence information 1035P which identifies the balloon$_1$ 1035 to the ASP in composition space 1002. Next, the ASP re-instantiates (step 1039) the object balloon$_1$ as 1041 and handles the event 1036 (paint blue) in step 1040. The object balloon$_1$ is transformed into balloon$_2$ 1042. The ASP then transmits balloon$_2$ 1042 (in step 1043) back to the interaction space 1003 with persistence information (object=1, color=blue, radius=5) 1045P. Finally, the balloon$_2$ is received as balloon2 1044 and displayed to user. In this example, it is noted that at least one advantage of storing the persistence information in the interaction space 1003 is that the interaction space is the best place to maintain this information.

When scaled for multiple users, the composition space would quickly be overrun by the significant amount of storage information required to be saved to as to remember the exact properties (also known as state information) of each object transmitted to a browser. The persistence information may be placed in each downloaded page at, for example, at the bottom of the page in a hidden field such as <input TYPE=HIDDEN NAME="balloon" VALUE="blue">. Alternatively, a designer may use cookies to perform similar state monitoring and persisting.

In one embodiment of the present invention, part of the operation of FORM elements is the need for specification of page methods to invoke when a FORM is POSTed to the page. A convention exists where DTCs on the page create their normal FORM field of a given name, and they also create a HIDDEN FORM field, which relates to the normal field name. The following is an example of the technique:

```
<INPUT TYPE=SUBMIT NAME=Cancel>
    <INPUT TYPE=HIDDEN NAME=Cancel_Method VALUE="CancelRequest">
```

When this FORM is POSTed back to its original ASP file, the code generated by the Page Object DTC sees the Cancel field in the POST information and look for the Cancel_Method field. If it finds such a field, it will use its value to determine which routine on the server page to invoke.

In the above case, the Page Object DTC becomes part of a scripting model that allows a developer to write code against the page.

Alternatively, it is contemplated that the initial instantiation (step 1031) may occur without a request from a browser, for example, for the purposes of broadcasting or multicasting using a push web model.

Another example relates to reducing the size of a text box as displayed on the client every time a user makes a selection. As this example is similar to the states of FIG. 5, a new figure is not shown. First, the object is created on the server and its length is set to 10. Next, the object is sent to the client with the persistence information identifying the object and identifying the length of the boxes at 10. The client clicks a button, sending an onclick event to the browser. The browser sends the onclick event with the persistence information identifying the object and the length (10) back to the server. The server reinstantiates the object, modifies its length, and sends it back to the client with new persistence information (object id, length=9), and the process repeats. Note here that, as above with the balloon, the server does not need to remember what object the client has as well as the properties of the object as the client may provide this information back to the sever with each event firing. To this end, the representation of the object and all state information as modified by the events is not stored on the server, but instead discarded as the client has this information.

Further, the client does not need to retransmit the entire object back to the server for event handling. Rather, the client may transmit the identification of the object as the server has the re-instantiation information stored in non-volatile memory 1030.

It should also be noted that the type of code for the server and client may be different. For example, the server may run JavaScript or may run C++. So, the object may not only move seamlessly between spaces but also be translated to different scripting languages appropriate for each space (for example, JavaScript in the composition space and HTML in the interaction space). Also, it should be noted that no user interface is needed in the composition space. Rather, the only user interface needed is in the interaction space as there is generally no user visually monitoring the instantiation of objects in the composition space. This monitoring is done on in the interaction space. In the above examples, all event handling was destined for the composition space. As the smart client may in corporate some event handling, other implementations may have the client handling at least some events.

F. Pages Treated as Objects

Another aspect of the present invention is the paradigm of pages implemented as objects. Page Objects may be used in conjunction with ASP pages. In this sense, a page may have methods and properties associated therewith. Also, by considering a page as an object, a developer can have a first page use a second page as if the second page were an object with associated methods and properties. To this end, the developer's conception of a web project is translated to look more like a collection of objects than a set of independent ASP pages. To this end, the collection of objects appears to someone familiar with traditional programming techniques as a collection of objects. The invention also includes the use of standard web authoring and interaction techniques to provide that same programmer with familiarity for inter-document interactions.

The page object aspect of the invention furthers the perception that the composition and interaction stages of a document's lifetime are part of a single object. Instead of hopping from document to document, a single document is repeatedly composed and interacted with (it repeatedly visits the composition and interaction spaces). The ability to 'hop' between documents is retained, but that capability is presented consistent with the object-based metaphor that is familiar to programmers.

Central to the object-based metaphor is the notion that a document has a name and that it has methods and properties. Methods may be implemented in either the local space or in the composition space. Methods which are implemented in the composition space are available for use in both composition and interaction spaces (e.g. navigate methods). Methods implemented in the local space are only available in the local space (e.g. getState/setState). Properties are available in both composition and interaction spaces.

As the conventional web custom composition of a page is confusing, the page object aspect of the invention clarifies the means for customizing pages by standardizing on traditional programming techniques. The existence of a method on a document is a means of requesting custom composition of a page. The method is called, standard web techniques are employed, and the page is recomposed according to the instructions in the method. The invention ensures that this appearance of 'calling a method' is maintained for the author of the document, to the point of permitting by-value parameters to be passed to the method.

Also, as the conventional method of maintaining data associated with a web document is also confused, the page object aspect of the invention clarifies the means by again standardizing on traditional programming techniques. The existence of a property on a document is a means of storing data in association with that document. At least this aspect of the invention ensures that the appearance of accessing a property on the document is maintained for the author of the document. This aspect of the invention also ensures that the property value is maintained, is accessible and is modifiable in both composition and interaction spaces.

Given the above, a document generally begins life in the composition space where it is initially composed (having been placed there by a designer working in a design space). Next, the composed document is moved to the interaction space. If the interaction requires recomposition of the page (invocation of a document method), the document is moved back to the composition space where it is recomposed (as discussed above with respect to FIG. 5. The recomposed document is moved back to the interaction space. This process repeats as many times as is dictated by the document and the user interactions with the document.

A refinement of the overall model is that the composition and interaction spaces can be implemented in a single process and that a variety of the interoperations between the two spaces become null operations. Thus, through the use of page objects, the composition space and implementation space may be considered as a single space.

The page object model of the invention also provides a means by which one document may request a transfer of execution to a different document. This is accomplished by having one document reference another using the invention at design time in the design space. The reference permits the author to gain access to the methods of another document from the current document. When the document is executing in either the composition or interaction spaces, it is possible for the document to invoke a method implemented in a referenced document. When this happens, the referenced document becomes the new document that passes between the composition and interaction spaces. Because a method is employed, by-value parameters may be used to pass information between the documents. When the change between documents takes place, the original document is discarded after saving the appropriate state information.

Figure 6:
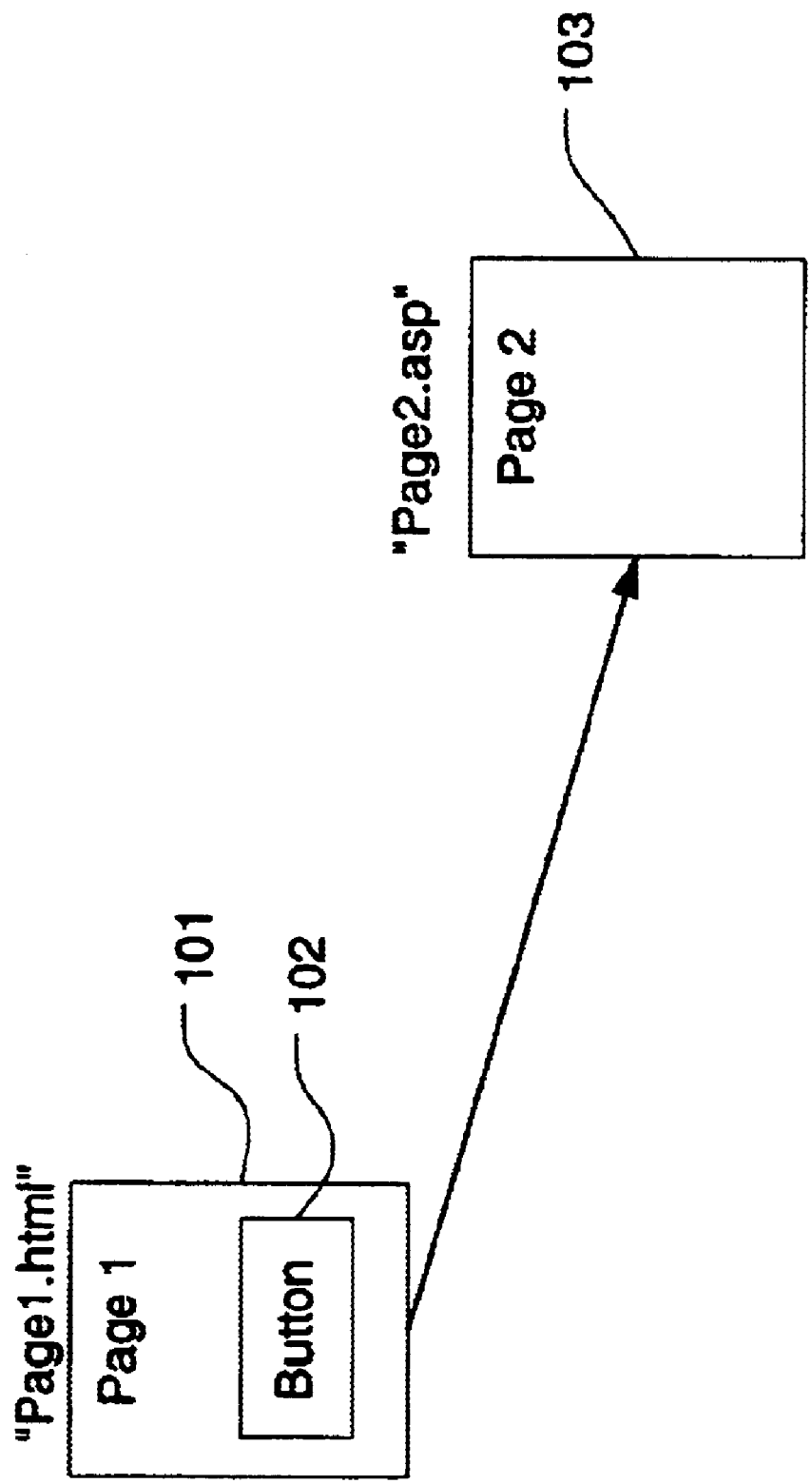
FIG. 6 is a representation of a first page treating a second page as an object in accordance with an embodiment of the invention.

FIG. 6 is a representation of a first page treating a second page as an object. "Page 1" 101, with the file name of page1.html, includes button 102. When button 102 is selected, "Page 2" 103, with the file name Page2.asp is accessed. For instance, page2.asp may be an active server page which accesses a database, retrieves a statistics on a person, creates an HTML page to display the statistics, and transmits the HTML page to the requesting browser. An example of the HTML representation of the script behind the button is as follows:

```
<input name=button
value="press me"
onclick="page2.show () ">
```

In the prior art, the HTML developer would have been forced to refer to page2.asp as a standard page. For example, the onclick parameter would have been represented as follows:

```
<onclick="window.navigate.href=/windows/webpage2.asp">
``` accessing page2.asp as stored in the windows/web directory. The difficulty experienced in referring to page2.asp as a new destination is that the coding for the developer becomes increasingly complex with numerous ASP files (the names remembered of whose files must be) and that each ASP had to be selected separately. If two ASP files were related and only differed in a few ways, for example, if the differed in terms of the number of fields that were searchable, then the two files would have to be coded completely independently of each other.

The addressing scheme of the present invention alleviates the previous addressing difficulty by allowing pages to be treated as objects (meaning that each page has its own transportable properties and methods associated with it) as well as objects being defined on the addressed pages themselves. In accordance with the invention, instead of requiring developer to separately code a new page 103 for each new button 102, the developer can embed objects in page2.asp and address the objects individually. In this regard, the developer may refer to the "show" method of page2.asp directly in the HTML code of page1.html by considering page2.asp to be an object with "show" as one of its methods.

Referring to the ASP page as an object is referenced herein as an "ASP Object". ASP object methods may be are implemented as standard script methods. They may be implemented in any supported scripting language. All methods are implemented as server methods, and as a result, require that the browser navigate to the page that implements the method. To make this clear to the developer, all exported methods are available within a subobject on the page called 'navigate'. This produces an invocation syntax that looks like:

```
page.navigate.method(p1, p2, etc)
```

As will be treated in greater detail below, the programming user interface may present a list of all available methods available on a target page. In order for programming model UI to present a list of available methods, a Page Object DTC (placed at the top of each page object) scans the page for content when the page is refreshed or accessed and parses the uncovered methods to eventually create a list of script content in the page. From this parsing, the DTC provides a scripting model against which one can write code as including the methods found on that page. Next, this knowledge of a Page Object DTC may be accessed by other pages. For example, if a developer is adding a reference to page2 from page1, the developer is interacting with the DTC on page1. When the reference (to page2 from page1) is added, the page1 DTC will examine the contents of page2, and locate the Page Object DTC information in that file. Next, it will instantiate the page2 Page Object DTC and retrieve from it a list of its object model elements.

As will be described with respect to FIG. 7, the developed page 1 101 is converted from the object-oriented programming environment into an HTML environment so as to be compatible with the various servers and clients to which page 1 101 is to be eventually sent. To this end, the opportunity for a developer to design in one environment, with the created pages later converted into a less-friendly HTML environment, enables the developer to relate scripts in a natural, object-oriented way, while preserving all functionality afforded by HTML script to end servers and end users.

An example of how the functionality of page 1 101 and page 103 may be implemented is as follows. The developer can place the function page2.show("Bob"), assuming one wants to look at an image of Bob, on the client's page. When interpreted into HTML script, the following would reside on the client's page:

```
<onclick="window.navigate.href=file: //c: \windows\web\page2.asp?na
me=Bob">.
```

This representation is invisible to the client; the client only sees the button with the label "press me". Once pressed, the active server page receives the request for Bob's image in a recognizable format. This representation is also invisible to the developer; the last call the developer saw for this function was page2.show("Bob"). Since the conversion is invisible to the developer and end user, all aspects of the HTML standard (for example HTML 4.0) may be exploited without modifying the standard to accommodate the enhanced development object-oriented interface. A similar implementation is available for posting data via the POST feature of HTML, which sends back name-value pairs to the active server page.

The posting of the string 'Bob' is accomplished by composing a URL for the overall method invocation (e.g. page2.navigate.show('Bob') might become 'Page2.asp?_ method=show&pcount=1&p0=Bob') and the URL is placed into a hidden field on the page. The hidden field is represented by the HTML "<INPUT TYPE=HIDDEN NAME=__method>". Setting the value of that hidden field is represented by the script "document.thisForm.__method.value= 'Page2.asp?__method=show&pcount=1&p0=Bob'". Posting the information is accomplished by submitting the form element on the HTML page. That is accomplished via the script "document.thisForm.submit( )". When the submit method is invoked on document.thisForm, all HTML input elements' names and values are collected together and sent in the form of an HTTP POST request to the destination URL. In this case, the destination URL may generally be the current page. The browser next re-requests the current page by sending the POST request, and the current page then unpacks the submitted information and decides what to do with the unpacked information. If the current page determines that "__method name" is represented in that information (because the __method hidden field had its value set before the POST), then the page will tell the browser to navigate to the URL indicated by the __method value. In this case, the new page is "Page2.asp?__method=. . . ". The browser sends a GET request to the server, asking for the content associated with that URL, and the server composes the page and sends it to the browser. By using the page object model of the present invention, a developer is shielded from coding the relationships. Rather, by using the page object metaphor, the designer writes code to methods in pages and the scripted interaction, as described above, is isolated from the detailed coding required to make detailed ASP pages work.

The implementation of the page2.navigate.show method on the client performs all the work leading up to document.thisForm.submit( ). Also, if a navigate is performed on the server, a POST is not performed. The reason for the POST is to carry the state information being maintained about the page from the client to the server, thus keeping intact the illusion of a single object which exists in either the composition space (the server) or the interaction space (the browser). So in the case of a server-side navigate method call, a POST is not necessary because the page state information does not need to go anywhere. When the method is invoked, the page cleans itself up by navigating to a new page.

Figure 7:
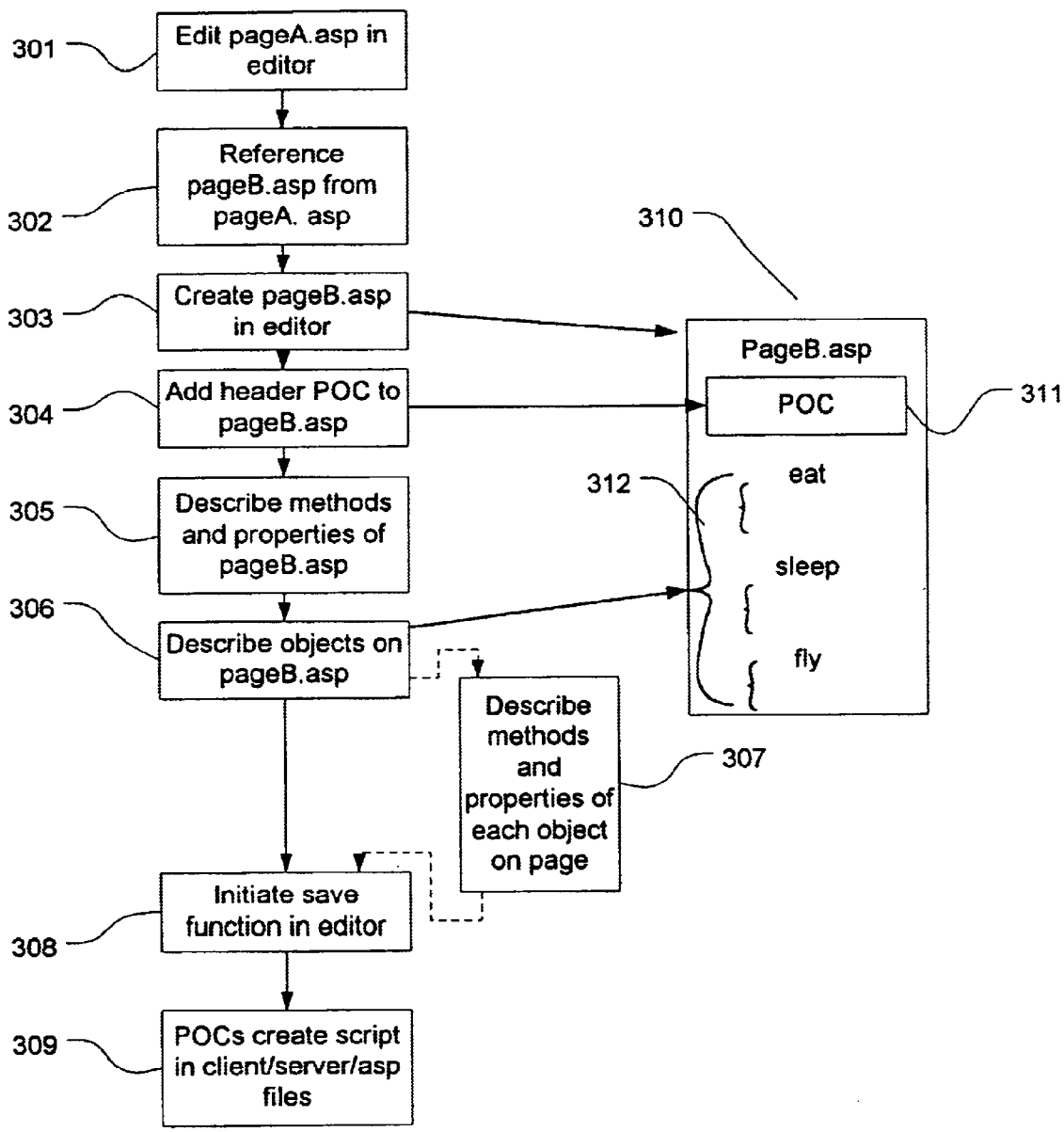
FIG. 7 is a flowchart illustrating the creation of a page in an editor according to embodiments of the present invention.

FIG. 7 is a flowchart illustrating the creation of a page in an editor. In this example, the developer is editing pagea.asp. Pagea.asp has a design-time control Page Object that provides a number of property pages, including, for example, a general property page, a methods property page, a properties property page, and a reference property page. In this example, the general property page of pagea.asp may include the name of the pagea.asp (in this case, "apple"). Accordingly, pagea.asp may be referred to as "apple" by other pages. For a show method on "apple", it may be referenced as apple.show ( ).

To allow one page to access a second page's methods and properties, the first page creates a reference to the second page. The reference causes the client and server script to be added to the first page, which will instantiate the desired proxy objects (as predefined in the second page) upon execution of the first page. In particular, when the reference is added, the design-time control of the first page, in one embodiment, locates the design-time control of the second page. Next, the first design-time control instantiates the second page's design-time control and ask for a description of the second page's objects. The information returned from the second page's design-time control is finally incorporated into the first page's design time control.

The constructor code (a code which is placed into one file that acts as a proxy for another file) assists with the use of the page object model. The constructor code (may be referred to by the nomenclature xxxxx-ctor) enables a proxy representation of the target page in the current page so that the designer can reference the objects of the target page.

Note that the current implementation is set up such that if Page1.asp is a page object, then it contains specially formatted text (known as XML) which describes the page as an object. At design time, another page which is loaded into the editor (and, therefore, has live Design Time Controls in it) can inspect the contents of Page 1.asp to determine what its methods and properties are and allow other pages to have code written against it.

These property pages are described in detail in FIG. 10, below. In addition to the provided property pages mentioned above, it is recognized that additional property pages may be added as needed to incorporate other object information or other non-object information for each page. Likewise, property pages can be deleted when the environment does not need every separate page.

While editing "apple" in step 301, the developer references pageb.asp (step 302). Noting that pageb.asp does not exist, the editor creates pageb.asp in step 303. Created pageb.asp is shown as page 310. After step 303, the editor inserts a Page Object DTC 311 into pageb.asp 310 in step 304. Next, if possible, the editor can attempt to populate the fields of the various property pages of new pageb.asp. Otherwise, the editor prompts the developer to describe the various methods and properties (and other information) relevant to pages (step 305). The editor may then prompt the developer for objects 312 (with methods eat, sleep, fly) to be included on page 310 (step 306). For the inclusion of objects, the developer may drag-and-drop in old objects to create a new collection of objects on the page 310. As indicated by dotted lines, next step may be included to describe the methods and properties of each new object 312 on the page 310 (step 307). The developer then proceeds to save the modifications made to the various pages (pagea.asp, pageb.asp) (step 308). The editor processes the DTCs to create appropriate scripts in new client and server pages and ASPs (step 309).

While FIG. 7 relates primarily to creating a new page with new methods and properties, it is clear that creating a new page from existing pages is similar. In creating a new page from existing objects, one incorporates the existing objects into the current page. The editor performs most of the functions of incorporating the referenced objects into the new page. For example, all object properties and methods may be entirely incorporated. Alternatively, the editor may step the developer through each method and property of the new object to allow the developer to modify the properties and methods as they are incorporated into the object of the new page. An HTML example of a new ASP file is as follows:

---

[scripting model start code]
[Page Object DTC]
<HTML>
<HEAD>
<META NAME="GENERATOR" Content="Microsoft Visual InterDev 1.0>
<META HTTP-EQUIV="Content-Type content="text/html; charset=iso-8859-1">
<TITLE>Document Title</TITLE>
</HEAD>

```
-continued

<BODY>
<!--HTML is inserted here--!>
</BODY>
</HTML>
<%
scripting model end code
%>
```

In this example, the call to the EndPageContent( ) method terminates the page.

This page will eventually contain, or be referred to as, an object. To explain how the objects between pages can interrelate, the interactions with respect to methods and properties are now described.

Figure 9:
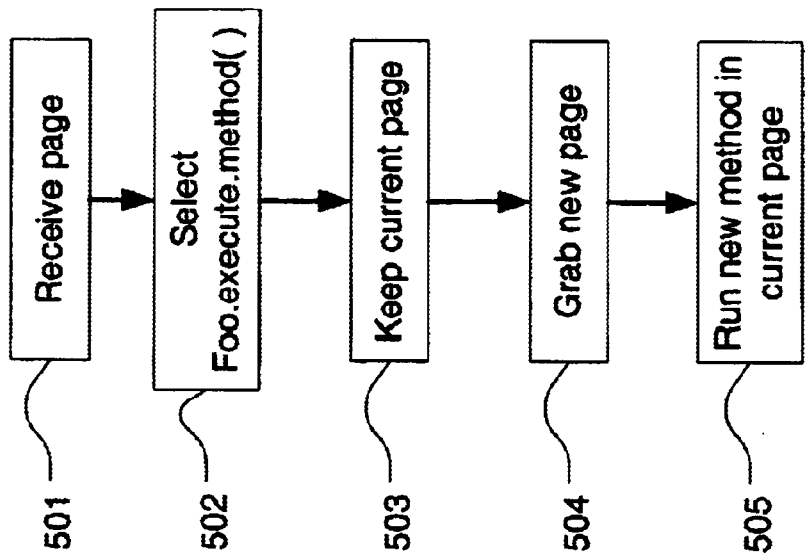
FIG. 9 is a flowchart illustrating a method for executing a method on a page according to embodiments of the present invention.
Figure 8:
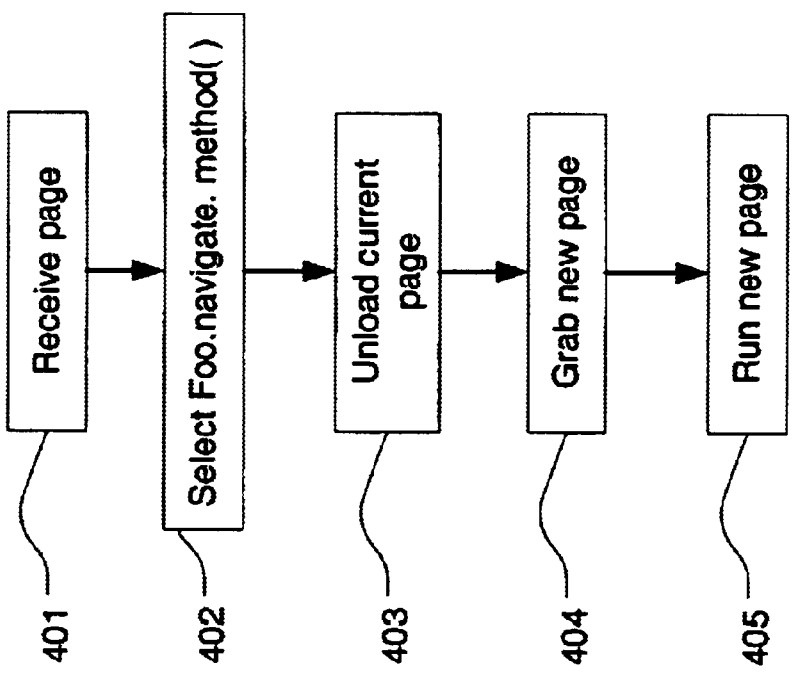
FIG. 8 is a flowchart illustrating a method of navigating to a new page according to embodiments of the present invention.

First, methods may be implemented as standard script models in any supported scripting language. Methods may interact in one of two ways: the method may require navigation to a new page or may be executed in the background and keep the end user's browser on a given page. FIGS. 8 and 9 describe these processes in detail from the browser's perspective.

FIG. 8 shows the receipt of a page in step 401. Next, the end user selects a method with the name of <foo.navigation.method( )> (relating to file foo) in step 402. The browser unloads the current page (step 403), grabs the new page foo with its method method (step 404) and runs the new page (405).

FIG. 9 relates to the execution of a method with no new navigation in the client's browser. FIG. 9 shows the receipt of a page in step 501. Next, the end user selects a method with the name of <foo.execute.method ( )> in step 502. In contrast to step 403, the browser keeps the current page (step 503), and grabs the new page (504), which accesses the method method. Finally, while the method method may be running elsewhere (or it may be running on the client), the client's browser receives the data generated by the method and returns them to the currently running page (505). To the extent that information is displayed by the new method, the method effectively appears to run in the current page.

FIG. 9 may be understood with relation to the following example: a browser has downloaded a page with various fields for entry of various baseball players' names along side a reserved field. The end user next selects the name of player Bob and transmits "Bob" to the server storing Bob's information. Instead of dumping the current page with the field bearing the data "Bob", the browser keeps the current page and populates the reserved field with the new information (for example, Bob's batting average). Before the current invention, previous web page developers had to create complex cookie sets for storing the entered information locally then repopulating cleared fields with cookie information. Alternatively, previous web page designers had to store the uploaded fields on a server temporally, repackage the stored information into a new page with the retrieved information, and download the combined web page. To this end, developers were hampered by the complex temporary data storage tasks needed to handle even the smallest of queries. With the present invention, the temporary storage problem is minimized, if not eliminated.

Figure 10:
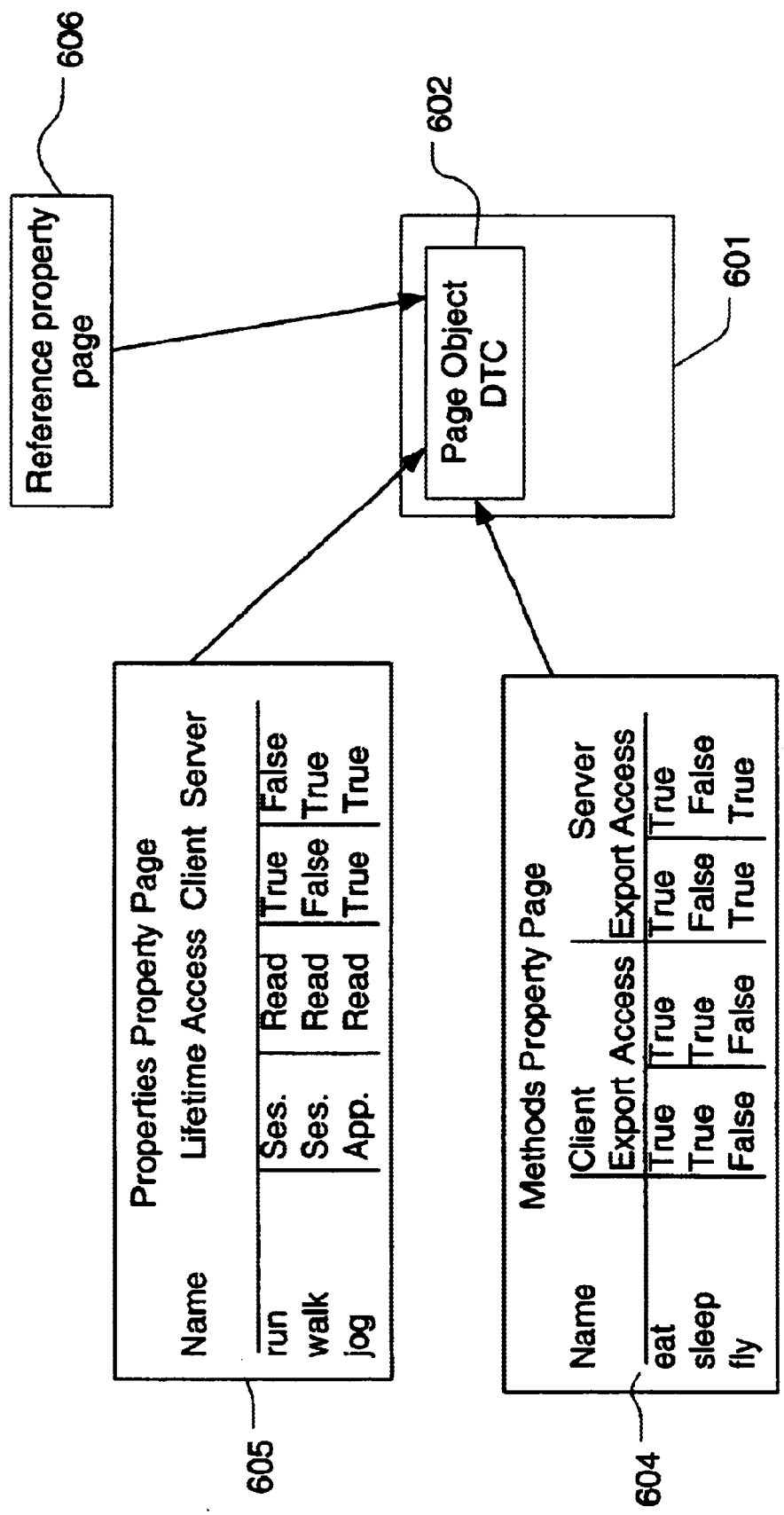
FIG. 10 shows a variety of property pages associated with an object page according to embodiments of the present invention; and, FIGS. 11 and 12 show a property exchange feature according to embodiments of the present invention.

FIG. 10 shows how the property pages may be ordered in a DTC page object 602 of a page 601. The DTC 602 supports three property pages: a methods property page 604, a properties property page 605, and a reference property page 606. Each property page has information that can be toggled according to the developer's wishes.

The method property page 604 indicates that page 601 contains three methods in it. The methods include "eat", "sleep", and "fly". The property page 604 also indicates where the methods may be exported. The exportation and the accessibility may be switched between choices. For example, the eat method may be exported to both the server and the client, the sleep method may be exported to the client only, and the fly method may be exported to the server only. Also, the eat method may be accessible from both the client and the server, the sleep method accessible from the client only, and the fly method accessible from the server only.

As used herein, being "exported" means that a method (implemented within the page on the server) should be accessible in some way either on the client or on the server. Being "accessible" from the client or the server means that contributions to the namespace of either the client or the server appear so that the method can be called from the client or the server. In particular, a proxy method is provided and is callable from script, which will navigate or redirect a browser to the proper URL.

One example of the implementation simply allows the designer to export a method. As disclosed herein, the method may be accessible from both client and server. An example of this accessibility is for the user to implement a "fly" method, go to the Page Object Methods property page, and add that method to the Navigate Methods grid. On the page, script can then call "thisPage.navigate.fly" in both the composition (server) and interaction (browser) execution spaces. Note, the first four lines through "%>" represent an example of the scripting model start code.

```
<%@ Language=VBScript %>
<% ' VI 6.0 Scripting Object Model Enabled %>
<!--#include file="__ScriptLibrary/pm.asp"-->
<% if StartPageProcessing () Then Response.End () %>
<FORM name=thisForm METHOD=post>
<HTML>
<HEAD>
<META name="VI60_DTCScriptingPlatform" Content="Client (IE 4.0 DHTML) ">
<META NAME="GENERATOR" Content="Microsoft Visual Studio 6.0">
<SCRIPT LANGUAGE=vbscript RUNAT=Server>
Sub fly ()
' do nothing
End Sub
</SCRIPT>
</HEAD>
<BODY>
```

-continued

```
<!--METADATA TYPE="DesignerControl" startspan
<OBJECT classid="clsid:8CC35CD6-E98B-11D0-B218-00A0C92764F5"
id=PageObject1 style="LEFT: 0px; TOP: 0px">
        <PARAM NAME="ExtentX" VALUE="4233">
        <PARAM NAME="ExtentY" VALUE="1508">
        <PARAM NAME="State"
VALUE=" (ObjectName_Unmatched=\qPatent\q, NavigateMethods= (Rows=1, R
ow1= (Name=\qfly\q, Parameters_Unmatched=\q0\q)), ExecuteMethods= (Ro
ws=0), Properties= (Rows=0), References= (Rows=0)) "></OBJECT>
-->
<SCRIPT LANGUAGE=JavaScript RUNAT=SERVER>
/* VIPM PAGE DESCRIPTION
<DSC NAME="Patent">
    <OBJECT NAME="navigate">
    <METHOD NAME="fly" SCENARIOS="CLIENT, SERVER"/>
    <METHOD NAME="show" SCENARIOS="CLIENT, SERVER"/>
    </OBJECT>
</DSC>
VIPM PAGE DESCRIPTION */
</SCRIPT>
<%
Sub [_PO_OutputClientCode] ()
%>
<SCRIPT LANGUAGE=JavaScript>
if (typeof Patent_onbeforeserverevent == 'function' || typeof
Patent_onbeforeserverevent == 'unknown')
    thisPage.advise ('onbeforeserverevent',
'Patent_onbeforeserverevent () ');
Patent = thisPage;
Patent.location = "Patent.asp";
Patent.navigate = new Object;
Patent.navigate.fly = Function ('thisPage.invokeMethod ("", "fly",
this.fly.arguments);');
Patent.navigate.show = Function ('thisPage.invokeMethod ("",
"show", this.show.arguments);');
</SCRIPT>
<%
End Sub
%>
<SCRIPT LANGUAGE=JavaScript RUNAT=SERVER>
function _PO_getClientAccessor (serverValue)
{
    if (serverValue == null)
        return 'null';
    return 'unescape ("' + escape (serverValue) + '")';
}
function _PO_ctor ()
{
    thisPage.getClientAccessor = _PO_getClientAccessor;
Patent = thisPage;
Patent.location = "Patent.asp";
Patent.navigate = new Object;
Patent.navigate.fly = Function ('return fly ();');
Patent.navigate.show = Function ('return;');
    thisPage._objEventManager.adviseDefaultHandler ('Patent', 'one
nter');
    thisPage._objEventManager.adviseDefaultHandler ('Patent', 'one
xit');
    thisPage.registerVTable (thisPage.navigate, PAGE_NAVIGATE);
}
function _PO_dtor ()
{
if (thisPage._redirect == '')
    _PO_OutputClientCode ();
}
</SCRIPT>
<!--METADATA TYPE="DesignerControl" endspan-->
<P>  </P>
</BODY>
<% ' VI 6.0 Scripting Object Model Enabled %>
<% EndPageProcessing () %>
</FORM>
</HTML>
```

The following sample of the above allows both the server and client to access the method.

```
<DSC NAME="Patent">
  <OBJECT NAME="navigate">
    <METHOD NAME="fly" SCENARIOS="CLIENT, SERVER"/>
    <METHOD NAME="show" SCENARIOS="CLIENT, SERVER"/>
  </OBJECT>
</DSC>
```

As with the methods property page 604, the properties property page 605 shows various characteristics of the properties. Here, three properties are on page 601: run, walk, and jog. The attributes include the type of property (session, page or application), the type of access (read-only, read/write), and to where the property exported/accessed. Other objects may not be contained within page 601. However, they may be referenced via placement in the reference page 606. To include an object in the page, the developer may drag and drop an object into the reference page and have all methods and properties included automatically. Finally, the general property page 603 relates to general information about page 601 (for example, its name).

Figure 11:
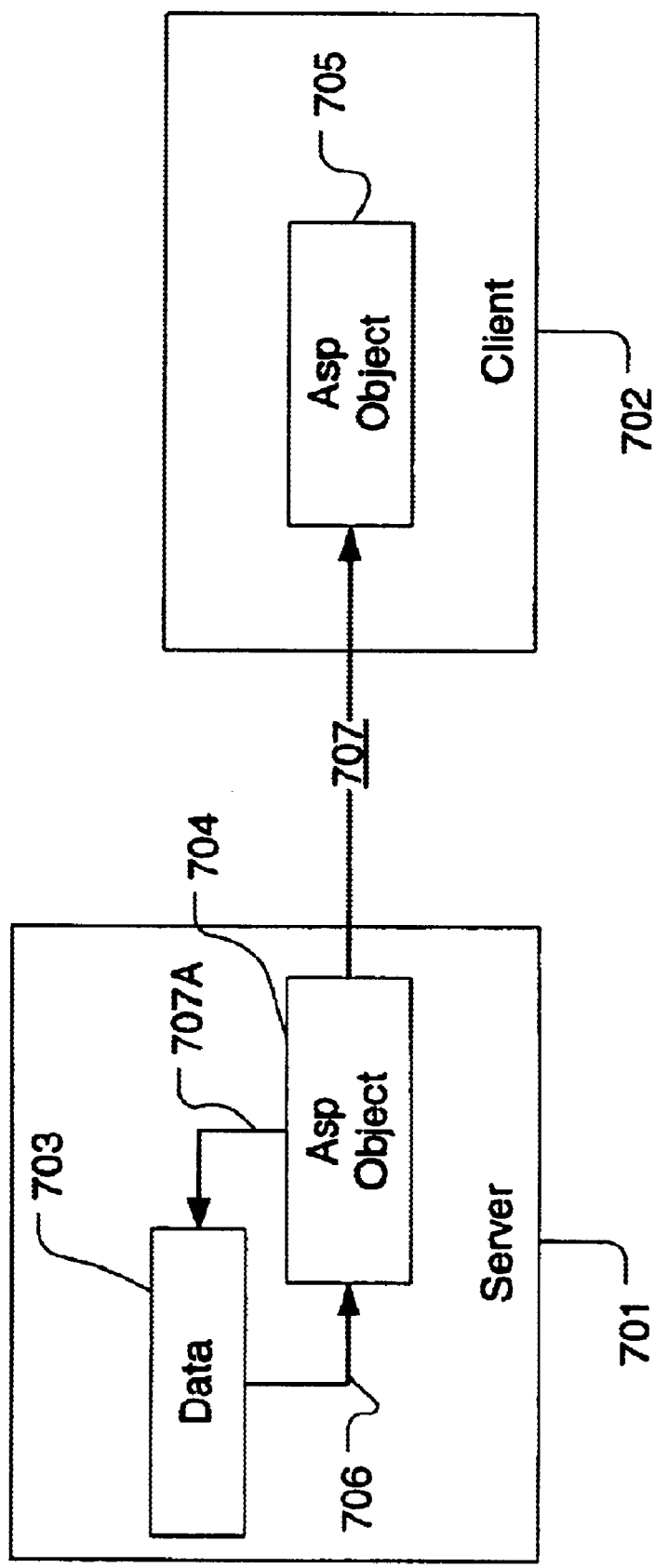
Figure 12:
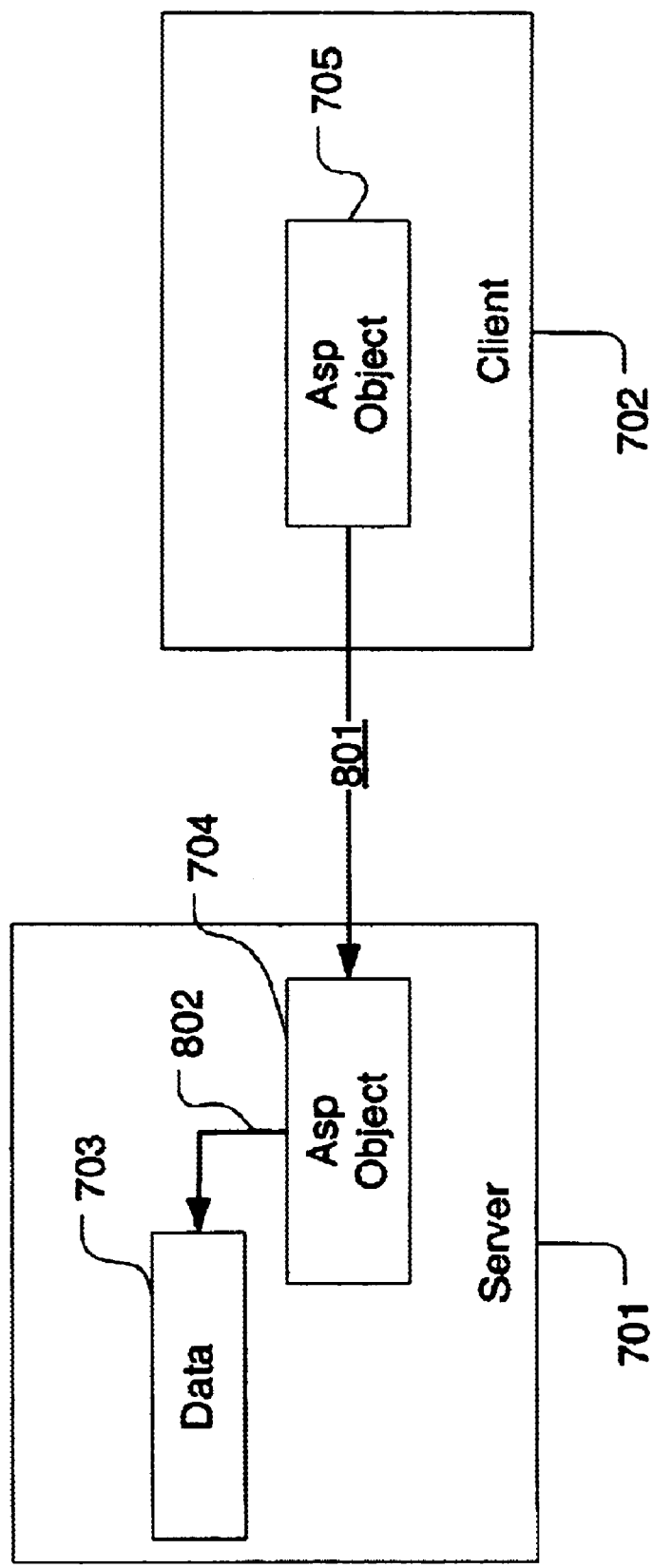

FIGS. 11 and 12 show a property exchange feature according to embodiments of the present invention. A property may be declared by the developer as being part of the ASP object, while its value may be stored in a server-side location. Alternatively, the values of the property may be stored in said ASP object itself.

FIG. 11 shows an ASP proxy object 704 located on server 701. When an ASP object is loaded by a server, the property values are retrieved 706 (from wherever they are stored 703) and are placed into the proxy objects properties 704. Also, the proxy object's properties for the client are prepared and stored in ASP object 704 as well. During construction of the page, the proxy objects' properties may be accessed and modified by the server script. If modified, the properties maybe sent back 707 to the data storage 703 for future retrieval.

When the page is delivered to the client 702 by data flow 707, the page properties are transmitted to the client as well. Generally, the properties of the objects sent to the client are marked read-only (meaning that server 701 will not accept any modifications of the properties from the client 702). The read-only status was previously set by the developer in the properties property page 605 of FIG. 6.

FIG. 12 relates to the posting of modified property information back to data storage 703. If the page property is marked read/write, the modified property is transmitted back to server 701, for example, by the client navigating to a new page or by posting 801 its data to the new page. Once the new page on the server receives the updated information, the modifications are combined and transmitted 802 to data storage 703.

In general, a page property is referred to as page.property=<%=server location%>. At least three server locations may be supported. The locations are referred to as the "lifetimes" of the properties. The three locations include on a page, in a session, and in an application. The term "on the page" means that the property is initialized to the null string when the page is composed. When the page is completed, no action is taken to modify the property. The session property is initialized from the session variable when the page is composed. When the page composition is complete, the session variable is updated. In the application location is treated the same as the session variable.

During normal operation of an ASP Object, a page is composed, delivered to the browser, run and then client script causes the browser to navigate to a new page, possibly another ASP Object. The browser advances to the desired page immediately. No changes to state by the client are automatically propagated back to the server. If the developer needs to move state back to the server, it may be manually coded using FORM elements, cookies, etc.

If the developer requests it, the programming model can operate such that changes to state can be sent back to the server. The operation of an ASP Object in this mode is the same as above, except that when client script is invoked to advance to the next page, the page state is collected, then it is delivered to the same page using a FORM POST, the state information is saved and then a redirect is used to advance the browser to the desired page.

The following provides examples of the invocations of the various techniques mentioned above as compared to conventional programming practices.

a) Method Invocation

When navigating from one page to another or even back to the same page, a conventional technique is to place one of the following constructs onto the page:

```
<SCRIPT LANGUAGE=VBSCRIPT>
Sub button_onclick ()
  window.location.href =
"reports/topscores.asp?category=baseball&start=1936&end=1945"
End Sub
</SCRIPT>
or
<A HREF="reports/topscores.asp?category=baseball&start=1936&end=1945">Baseball Scores</A>
```

Both constructs involve reacting to some user action to cause the browser to move to a new page or to revisit the current page. The constructs get more involved when variables are used as part of the destination URL:

```
<SCRIPT LANGUAGE=VBSCRIPT>
Sub button_onclick ()
  parameters = "?category=" & catCurrent
  parameters = parameters & "&start=" & datStart
  parameters = parameters & "&end=" & datEnd
  window.location.href = "reports/topscores.asp" & parameters
End Sub
</SCRIPT>
```

The complications continue if a parameter is to be completely omitted:

```
<SCRIPT LANGUAGE=VBSCRIPT>
Sub button_onclick ()
  parameters = "?"
  If Not IsNull (catCurrent) Then
    parameters = "category=" & catCurrent
  End If
  If Not IsNull (datStart) Then
    parameters = parameters & "&start=" & datStart
  End If
  If Not IsNull (datEnd) Then
    parameters = parameters & "&end=" & datEnd
  End If
  window.location.href = "reports/topscores.asp" & parameters
End Sub
</SCRIPT>
```

The page object model aspect of the current invention collapses all of this into a single, programmatic notation:

```
<SCRIPT LANGUAGE=VBSCRIPT>
Sub button_onclick ()
  TopScores.navigate.show (catCurrent, datStart, datEnd)
End Sub
</SCRIPT>
```

The significant information is passed to a routine on an object that represents the file "reports/topscores.asp". That object is called "TopScores" and was explicitly named by the web site author. The "show" method was also explicitly created by the author of the "TopScores" page.

The invention includes capabilities, which are common to programming tools, such as 'statement completion'. This is an aid that is provided to the author where as the method invocation is typed, prompts are presented which describe the available choices at a given point. Those prompts include a list of methods available and, once a method is selected, a list of the parameters that should be passed to the method.

Internal to a method invocation supported by the invention, the same sort of operation performed in the samples above is accomplished behind the scenes. The parameters are converted to text, concatenated together as appropriate into a URL and then that URL is contained in the information sent to the composition space. Once received, the information is unpacked and the actual method, which exists in the composition space, is invoked. The invocation is actually more complicated than that and a number of other operations are intermingled with the ones described. However, the essentials are covered by the above.

b) Property Management

There are four aspects to managing property information on a web page: access in the composition space, propagation to the interaction space, access in the interaction space, and propagation to the composition space.

Each of these four aspects requires a specific technique or techniques, and the resulting content in the authored page can be nearly impossible to maintain. Because the invention considers all four aspects to be part of a single problem, the invention presents the single concept of a page property to solve that problem.

A page property is created by an author. The author chooses the name of the property, how it may be accessed in the composition and interaction spaces (read-only versus read-write, etc), and its 'lifetime'. The lifetime is a statement of where the data of the property should be officially stored. There are three lifetimes: page, session and application. The notion of 'forever' would be another lifetime that might suggest storage in a database on the server. The invention does not provide an implementation of a 'forever' lifetime, but it is easily within the scope of the invention.

The invention provides access to property values via 'get' and 'set' methods. Those methods are referenced as variable=TopScores.getproperty( )

TopScores.setproperty(variable)

This notation is used identically in the composition and interaction spaces.

(1) Access in the Composition Space

Script running during composition retrieves the latest value from the appropriate storage location at the beginning of page composition and automatically stores changes to that location as changes are made. All access is accomplished via getproperty and setproperty methods associated with the page object.

(2) Propagation to the Interaction Space

Script running at the end of the composition phase outputs script that provides the necessary object model in the interaction space. That script includes the values of the various pieces of data as initializers to internal variables. Also output are a set of hidden input fields that will be used in item 4 below.

(3) Access in the Interaction Space

As with the composition space II access is accomplished via getproperty and setproperty methods associated with the page object.

(4) Propagation to the Composition Space

As changes are made to properties via setproperty methods in the interaction space, the changed values are stored in the hidden input fields created in item 2. When the user interacts with the page such that a method in a page should be executed, the property values are propagated back to the composition space by posting the current page's FORM element. That post operation causes the hidden input fields to be sent to the composition space where they are unpacked and stored in the appropriate data storage, as well as being made available to a new pass through the composition space—starting with item 1.

There are sufficient controls provided by the invention that an author can control a variety of aspects of data management, including permitting access only within the composition space or access only within the interaction space, etc.

c) Controlling Composition

The invention changes the normal pattern of page composition of an ASP. That is, it takes advantage of the very general page composition approach used, and creates a more specific approach. The standard ASP page composition technique is to process the page from the beginning to the end, generating output as the page is processed. The invention introduces a variety of notions, including 'events' that are fired at the beginning and end of page composition. Also part of the invention's innovations is the execution of a page method as described above.

The composition process of a page object may follow these steps:

1. Run all constructors defined on the page. Constructors are usually added to the page by Design Time Controls, which leverage the invention's page composition model.
2. Fire the oninit event, completing any initialization steps that could not happen in the construction phase. As above, oninit event handlers are usually added to the page by Design Time Controls.
3. Fire the onenter event, which is usually implemented by the page author and permits execution of page initialization operations.
4. Invoke the requested method on the page.
5. Complete conventional processing on the page. This means that the page is processed from beginning to end as a conventional ASP would. There are controls provided by the invention to skip this step, which is usually what happens when the requested method generates the complete response that would normally be generated by processing the page.
6. Fire the 'onexit' event.
7. Run all destructors defined on the page. As with the constructors, destructors are usually added to the page by Design Time Controls.

Various objects may be incorporated into the scripting libraries as discussed above. The objects and their definitions may include:

Page—Allows developers to treat ASP pages as objects with methods, properties, and events
Recordset—Supports data-binding to an ADO recordset using the Data Environment
Textbox—A data-bound textbox
Label—A data-bound label
Listbox—A data-bound listbox with static or data-bound lookup values
Button
RSNavBar—A set of buttons for navigating through a list of items
Checkbox
OptionGroup The sections below show some examples of web programming tasks and how the SOM makes implementing them easier and simpler. The samples are not intended to illustrate real-world applications but rather the kinds of implementation issues web programmers face.

(1) Processing User Input on the Server

This sample page implements two textboxes, a listbox, and button. The user enters numbers in two textboxes, selects an arithmetic operation, clicks the button to post the form, and then server script performs the operation on the numbers and shows the result. The page also preserves the data the user entered when the page is regenerated after the post.

Below is a version of this page implemented using traditional ASP programming:

```
<%
Dim Result, Operation
Dim Value1, Value2
Dim HaveResult
Value1 = 1
Value2 = 1
HaveResult = False
If Reguest.ServerVariables("REQUEST_METHOD") = "POST" Then
    Value1 = CInt(Request.Form("text1"))
    Value2 = CInt(Request.Form("text2"))
    Op = CInt(Request.Form("select3"))
    HaveResult = True
    Select Case Op
        Case 10:
            Result = Value1 + Value2
            Operation = "plus"
        Case 20:
            Result = Value1 − Value2
            Operation = "minus"
        Case 30:
            Result = Value1 / Value2
            Operation = "divided by"
        Case 40:
            Result = Value1 * Value2
            Operation = "times"
    End Select
End If
%>
<form method=POST>
Number 1:<input type=text name=text1 value="<%=Value1%>"><br>
Number 2:<input type=text name=text2 value="<%=Value2%>">
<select name=select3>
<option value=10 <% If Op = 10 Then Response.Write "SELECTED" %>>Add</option>
<option value=20 <% If Op = 20 Then Response.Write "SELECTED" %>>Subtract</option>
<option value=30 <% If Op = 30 Then Response.Write "SELECTED" %>>Divide</option>
<option value=40 <% If Op = 40 Then Response.Write "SELECTED" %>>Multiply</option>
</select><br>
```

```
<input type=submit value="Submit">
<%
If HaveResult Then
Response.Write("<p>" & Value1 & Operation & Value2 & "is" & Result & "</p>")
End If
%>
</form>
```

To a designer familiar with conventional programming languages like Visual Basic or Java, this simple application appears confusing. To understand how to build a page like this, the developer is required to have a deep level of understanding about the interaction between the web server and browser and how HTML forms posting works. This programming model also cannot be easily represented in a visual rapid application development model, which leaves the developer hand-coding the page.

Compare this to the same sample created with the scripting object model using DTCs:

```
<SCRIPT RUNAT=SERVER LANGUAGE=VBSCRIPT>
Sub thisPage_onenter ()
    If thisPage.firstEntered Then
        TextBox1.value = 1
        TextBox2.value = 1
        ListBox1.addItem "Add", 10
        ListBox1.addItem "Subtract", 20
        ListBox1.addItem "Divide", 30
        ListBox1.addItem "Multiply", 40
        ListBox1.selectByValue (10)
    End If
End Sub
Sub Button1_onclick
    Dim Result
    Dim Value1, Value2
    Value1 = CInt(TextBox1.value)
    Value2 = CInt(TextBox2.value)
    Select Case CInt(ListBox1.getValue())
        Case 10:
            Result = Value1 + Value2
            Operation = "plus"
        Case 20:
            Result = Value1 − Value2
            Operation = "minus"
        Case 30:
            Result = Value1 / Value2
            Operation = "divided by"
        Case 40:
            Result = Value1 * Value2
            Operation = "times"
    End Select
    Label1.setCaption(Value1 & Operation & Value2 & "is" & Result)
End Sub
</SCRIPT>
Number 1:
[TEXT BOX1]
<br>
Number 2:
[TEXT BOX2]
[MENU]
<br>
[SUBMIT BUTTON]
<p>
[LABEL1]
</p>
```

The above sample may be quickly created by dragging a few controls into the editor and creating two event handlers—thisPage_onenter, which is fired when the user first navigates to the ASP page, and Button1_onclick.

(2) Navigating to a Server Method on a Page

The script fragments below show a conventional way of passing information to a server page by building a query string into the URL passed to the server:

```
PAGE1.ASP:
    <%
    Response.Write ("<A
    HREF=""page2.asp?function=ProcessQuery1&parm1=" & parm1 &
    "&parm2=" & parm2 & "">Start Query 1</A>")
    Response.Write ("<A
    HREF=""page2.asp?function=ProcessQuery2&parm1=" & parm3 &
    "">Start Query 2</A>")
    %>
PAGE2.ASP
    <%
    parm1 = Request.QueryString ("parm1")
    parm2 = Request.QueryString ("parm2")
    func = Request.QueryString ("function")
    If func = "ProcessQuery1" Then
        'code for the first operation
        Else
            'code for the second operation
        End If
    %>
```

This process may be quickly complicated as the number of possible operations and parameters increases.

Through the Page object, the scripting object model provides a general-purpose way of publishing methods on a page so they can be invoked from client script on the current page or on other pages that reference the current page. The Page Object DTC provides a graphical way to publish methods using the Page object. The script fragments below show the same functionality implemented using the Page Object:

```
PAGE1.ASP:
    <%
    Response.Write ("<A
    HREF='Javascript:page2.navigate.ProcessQuery1 (parm1,
    parm2)'>Start Query 1</A>")
    Response.Write ("<A
    HREF='Javascript:page2.navigate.ProcessQuery2 (parm3) '>Start
    Query 2</A>")
    %>
PAGE2.ASP
    <SCRIPT RUNAT=SERVER LANGUAGE=VBSCRIPT>
    Sub ProcessQuery1 (parm1, parm2)
        'code for first operation
    End Sub
    Sub ProcessQuery2 (parm1)
        'code for second operation
    End Sub
    </SCRIPT>
```

The two methods on PAGE2 were published using the Page Object DTC, and a reference to PAGE2 was made from PAGE1 also using the Page Object DTC, to make those methods available in the SOM on PAGE1. The resulting code is simpler and far more readable than in the first example because it uses a more familiar programming model.

(3) Remote Execution of a Server Method

Another example is remote scripting. The Page object allows a developer to publish a method on a page that can be called synchronously or asynchronously from the client without posting a form. This allows a web page to remain live in the browser while a script fiction on the server is called and returns a value. The call can be synchronous; blocking until the remote call completes, or a callback function can be provided to process the function's return value asynchronously. Remote method calls can save bandwidth and reduce server load by avoiding the cost of regenerating the entire page after a post and sending it to the browser.

The sample below shows an asynchronous remote scripting call that passes a user name to a server script function that returns the corresponding user id. A callback function processes the return value and navigates to a members page if the user id is valid.

```
<%
Function Lookup (name)
    Lookup = dbLookupUser (name)
End Function
%>
<SCRIPT>
function ProcessResult (rscb)
{
    if (rscb.return_value == -1)
        alert("You do not have a valid user id.")
    else
        Members.navigate.LoginUser(rscb.return_value);
}
</SCRIPT>
<INPUT TYPE=TEXT NAME=UserName VALUE="">
<BUTTON NAME=Enter VALUE="Enter"
ONCLICK='thisPage.execute.Lookup (thisForm.UserName.value,
ProcessResult)'>
```

(4) Sharing State Between Client and Server

Earlier examples addressed the issues of state management by demonstrating that the scripting object model objects manage their own state. To maintain state between objects, an additional approach can be used. The ASP script fragment below shows how this may be done using a hidden form element. The page initializes a value and then increments it by one each time the user clicks a button.

```
<%
Dim Value1
If Request.ServerVariables ("REQUEST_METHOD") = "POST" Then
    Value1 = Request.Form("Value1")
    Value1 = Value1 + 1
Else
    Value1 = 0
End If
%>
<FORM NAME=MyForm METHOD=POST>
<INPUT TYPE=HIDDEN NAME=Value1 VALUE="<%=Value1 %>">
Value = <%=Value1%><br>
<INPUT TYPE=SUBMIT VALUE="Submit">
```

The scripting object model (SOM) makes state management easier by providing a way to publish page properties through the Page object. Using the Page Object DTC the developer can publish a property, which can then be accessed using "get" and "set" methods on the Page Object. The sample below shows the same functionality implemented using the SOM:

```
<SCRIPT LANGUAGE=VBSCRIPT RUNAT=SERVER>
Sub thisPage_onenter
    If thisPage.firstEntered Then
        thisPage.setValue1 (0)
    End If
End Sub
```

-continued

```
Sub Button1_onclick
    thisPage.setValue1(thisPage.getValue1 () + 1)
    End Sub
</SCRIPT>
Value = <%=thisPage.getValue1 () %><br>
<INPUT TYPE=SUBMIT VALUE="Submit">
```

The remote scripting components of the Scripting Library include a set of client script functions and objects that can be used in conjunction with the Page Object DTC or separately. When used with the Page Object DTC, remote scripting functions are published as methods of the execute object.

G. Construction of Objects

The Scripting Object Model (SOM) provides an event-based execution model for ASP pages. As discussed above, while in actuality, the page is executed serially as any other ASP page, the SOM provides a framework for programming to an event-based model.

At a high-level, the execution and eventing sequence is similar to the DHTML browser execution sequence. Objects on the page are constructed and initialized. An onenter event is fired to indicate that the page is loaded and all objects are ready to be scripted. This is an ideal place to initialize variables and objects. After the onenter event is fired, execution is transferred to an entry-point or event-handler. By default, the content portion of the page will be executed which is equivalent to invoking the show entry-point. In many cases, execution will transfer to a server-side handler as a result of a button click or some other user action. An onshow event is fired just prior to executing the content portion of the page. This is an ideal place to set the final state for any objects just prior to them rendering their HTML output. After the content portion of the page is executed, an onexit event is fired to indicate the page is unloading.

1. Execution and Event Sequence a) Object Construction Phase

Each object is constructed. This is accomplished by executing all JScript functions which conform to the following naming convention, "xxxx_ctor". The DTCs generate a _ctor function for the runtime object they represent. One implementation executes each _ctor in the order it appears on the page. An object constructor should be self-contained, and should not expect any other object to have already been constructed.

b) Construction of the "thisPage" Object

The first object constructed will be a SOM Object named thisPage. This object provides properties, methods, and events that comprise the Scripting Object Model. Other objects will use the thisPage object for state services, event notification, and other purposes.

c) Registering an Initialization Function

The constructor function of each object will register an initialization function with the thisPage object via the advise method. The initialization functions will be invoked during the initialization phase, after all object constructors have been invoked. A pointer to the initialization function is provided as a parameter to the constructor, and the function implementation is generated by a DTC based on the properties set at design-time. A Recordset object will register its initialization function with a higher priority than other objects. This ensures that the Recordset objects will be initialized before any other objects that may depend on the Recordset for databinding.

d) Registering Default EventHandlers

The constructor function for most objects may register any default EventHandlers for the object. A default EventHandler is a method which conforms to the naming convention "object_event". The Recordset object will defer registration of its default EventHandlers until the end of the initialization phase (with the exception of the onbeforeopen event). This ensures that the default Recordset EventHandlers will not be fired until all other objects have been both constructed and initialized.

e) Object Initialization Phase

The registered initialization functions will be invoked in this phase. The functions are invoked in priority order, with functions of same priority being invoked in the order registered.

f) Recordset Initialization

The Recordset initialization functions are registered with a high priority, such that all Recordsets will be initialized before any other objects. The initialization function of the Recordset will setup the connection and command for the Recordset based upon settings chosen via the Recordset DTC property pages at design-time. If the Recordset is set to autoopen or if the Recordset was left open on the previous roundtrip to this same page, the Recordset will be opened at this point. To prevent a Recordset from being opened during this initialization phase, the autoopen flag should be disabled in the DTC property page, and the Recordset should be explicitly closed prior to exiting the page. The thisPage_ onexit handler is a good place for closing Recordsets.

g) Object Initialization

Object initialization functions are registered with a neutral priority, and will be invoked after high priority initialization functions, such as those for the Recordset. Objects which are set to databind to a Recordset, will use the advise method of the appropriate Recordset to register a handler on the onrowenter event and possible the onbeforeupdate event. The onrowenter handler will be used to bind data from the Recordset into the object. The onbeforeupdate handler will be used to bind data from the object into the Recordset. If the Recordset is already open when an object registers an onrowenter handler, then that handler will be invoked immediately in order to bind the object to the current row of the Recordset. Following the registration of databinding handlers, the object will restore any state that has been roundtripped back to this page.

h. Summary

The programming model and embodiments thereof in various forms provides a number of advantages to the various users. For example, the system provides an easier way for developers to conceptualize a site. Also, in targeting an IE 4 DHTML client, a programmer can run VB-like forms, can write code for the end client and can provide an interactive environment for the end client. Further, supplied forms may be supported by objects and script behind the form. This form then can execute on a server in a linear sequence.

While the above embodiments considered with reference to design-time controls, alternative controls may also be used. In particular, because a design-time control can be made part of a page, and therefore inadvertently deleted by a developer, an alternative embodiment of the invention uses separate pages for the control and property pages for each object. These pages would be inaccessible by developers by placing them in an alternate directory or by making them read-only.

Depending on its programming, each design-time control may include non-ActiveX scripts as well. Therefore, by instantiating the design-time control into a web page, the resulting run-time code may include both the ActiveX implementation as well as the non-ActiveX counterpart.

Non-ActiveX scripts may include, for example, JAVA® (by Sum Microsystems). Other non-ActiveX scripts may also be included.

It will be apparent to those skilled in the art that application of the present invention is not restricted to the Internet. It is also envisioned that the techniques of the present invention apply to any network using HTTP, including HTTPS-compliant networks, intranets and extranets. It is further envisioned that the techniques of the present invention apply in any text-authoring context where complex scripts require detailed knowledge of databases as well as related pages. For example, embodiments of the present invention contemplate the use of the programming object modeling system in conjunction with other systems including spreadsheets and other related environments.

Further, the present invention may also be implemented in a peer-to-peer computing environment or in a multi-user host system with a mainframe or a minicomputer. Thus, the computer network, in which the invention is implemented, should be broadly construed to include any client/server computer network from which a client can retrieve a remote document on a server (even if that document is available on the same machine or system).

In the foregoing specification, the present invention has been described with reference to specific exemplary embodiments thereof. Although the invention has been described in terms of a preferred embodiment, those skilled in the art will recognize that various modifications, embodiments or variations of the invention can be practiced within the spirit and scope of the invention as set forth in the appended claims. All are considered within the sphere, spirit, and scope of the invention. The specification and drawings are, therefore, to be regarded in an illustrated rather than restrictive sense. Accordingly, it is not intended that the invention be limited except as may be necessary in view of the appended claims.

We claim:

1. A method of operating a user interface, said interface providing a designer with an enhanced programming environment, said method comprising the steps of:

selecting an object from a library of objects capable of being dragged and dropped onto a page, said objects including script that executes on one of a server and a client;

placing the object on a page;

providing a determination of whether script supporting said object should execute on said server or said client to said environment;

responding to said determination by receiving from said library of objects at least one of a first script for instantiating said object on said server and a second script for instantiating said object on said client;

transmitting said page to a server with at least one of said first script and said second script.

2. The method according to claim 1, further comprising the step of:

wherein in response to said transmitting step, said server saves said page.

3. The method according to claim 1, further comprising the step of:

storing said determination in a page object control on said page.

4. The method according 1, further comprising the step of:

calling said object on said page from a second page.

5. The method according to claim 4, wherein said calling step further comprises the step of:

referencing a page object control on said page.

6. A system for providing a designer with an enhanced programming environment comprising:

a library of objects capable of being dragged and dropped onto a page, at least one of said objects including script being configurable to execute on one of a server and a client;

a first display portion representing a page, the first display portion receiving dragged and dropped objects;

a second display portion displaying said library of objects, said system providing for dragging and dropping the objects from said second display portion into the first display portion;

a third display portion for configuring at least one of a method or property of one of the objects after the one of the objects has been dragged and dropped into the first display portion; and a page object control storing whether said object should be scripted on said client or said server.

7. A system for providing a designer with an enhanced programming environment comprising:

a library of objects capable of being dragged and dropped onto a page, at least one of said objects including script being configurable to execute on one of a server and a client;

a first display portion representing a page, the first display portion receiving dragged and dropped objects;

a second display portion displaying said library of objects, said system providing for dragging and dropping the objects from said second display portion into the first display portion;

a third display portion for configuring at least one of a method or property of one of the objects after the one of the objects has been dragged and dropped into the first display portion; and a second page calling said object located on said page, wherein said second page calls a page object control containing at least one property or method for said object.

* * * * *

UNITED STATES PATENT AND TRADEMARK OFFICE
CERTIFICATE OF CORRECTION

PATENT NO.    : 6,714,219 B2
DATED         : March 30, 2004
INVENTOR(S)   : Gregory Lindhorst It is certified that error appears in the above-identified patent and that said Letters Patent is hereby corrected as shown below:

Column 23,
Line 9, after "(Rows=0))" delete "">" and insert -- "> --, therefor.

Column 31,
Line 10, after "HREF=" delete " ""' " and insert -- "" -- therefor.
Line 11, after "parm2 &" delete " "" " and insert -- ""--, therefor.
Line 11, after "</A>" delete " " " and insert -- " --, therefor.
Line 12, after "Write" delete "("" and insert -- (" --, therefor.
Line 13, after "HREF=" delete " "" " and insert -- "" --, therefor.
Line 13, after "parm1=" delete " " " and insert -- " --, therefor.
Line 14, delete " ""' " and insert -- "" --, therefor.
Line 65, delete "fiction" and insert -- function --, therefor.

Column 32,
Line 12, insert -- [PAGE OBJECT] -- above "<%".
Line 25, after "VALUE=" delete " "" " and insert -- "" --, therefor.
Line 61, insert -- [PAGE OBJECT] -- above "<SCRIPT LANGUAGE".

Column 35,
Line 49, delete "receiving" and insert -- retrieving --, therefor.

Signed and Sealed this

Twenty-first Day of June, 2005

JON W. DUDAS
*Director of the United States Patent and Trademark Office*